US007597163B2

(12) United States Patent
Goertzen et al.

(10) Patent No.: US 7,597,163 B2
(45) Date of Patent: Oct. 6, 2009

(54) OBSTACLE TRAVERSING WHEELCHAIR

(75) Inventors: Gerold Goertzen, Brunswick, OH (US); William A. Null, Jr., Sullivan, OH (US)

(73) Assignee: Invacare Corporation, North Olmsted, OH (US)

( * ) Notice: Subject to any disclaimer, the term of this patent is extended or adjusted under 35 U.S.C. 154(b) by 432 days.

(21) Appl. No.: 11/490,899

(22) Filed: Jul. 21, 2006

(65) Prior Publication Data

US 2006/0255581 A1   Nov. 16, 2006

Related U.S. Application Data

(60) Continuation of application No. 11/209,001, filed on Aug. 22, 2005, which is a continuation of application No. 10/390,386, filed on Mar. 17, 2003, now Pat. No. 6,935,448, which is a continuation of application No. 09/698,481, filed on Oct. 27, 2000, now Pat. No. 6,554,086, and application No. 11/145,477, Jun. 3, 2005, now Pat. No. 7,219,755, said application No. 11/209,001 is a continuation of application No. 10/390,133, filed on Mar. 17, 2003, now Pat. No. 6,923,280, which is a division of application No. 09/698,481, filed on Oct. 27, 2000, now Pat. No. 6,554,086.

(51) Int. Cl.
*B60K 1/00* (2006.01)
(52) U.S. Cl. ............... 180/65.1; 180/907; 280/304.1
(58) Field of Classification Search ............ 180/65.1, 180/907, 24.05; 280/47.16, 47.12, 250.1, 280/304.1, 642, 647, 124.149, 124.137, 124.138
See application file for complete search history.

(56) References Cited

U.S. PATENT DOCUMENTS 2,427,482 A    9/1947  Wiessman
2,986,200 A    5/1961  Nobile
3,104,112 A    9/1963  Crail
3,174,176 A    3/1965  Olson
3,191,990 A    6/1965  Rugg et al.

(Continued)

FOREIGN PATENT DOCUMENTS

CA           2254372           5/2000

(Continued)

OTHER PUBLICATIONS

"Big Bounder Power Wheelchair: Conventional "Tubular" Style Frame"; http://www.wheelchair.com/bigbounderpage.htm, Accessed on the World Wide Web on Dec. 17, 2003, p. 1-4.

(Continued)

*Primary Examiner*—Christopher P Ellis
*Assistant Examiner*—Katy Meyer
(74) *Attorney, Agent, or Firm*—Calfee, Halter & Griswold LLP

(57) ABSTRACT

A wheelchair suspension is provided. The wheelchair suspension includes a frame, a pivot arm, a front caster, a drive assembly, and a rear caster. The pivot arm is pivotally coupled to the frame. The front caster is coupled to the pivot arm. Movement of the drive assembly in a first direction causes the pivot arm to substantially remain in a first position. Movement of the drive assembly in a second direction urges the pivot arm away from the first position.

34 Claims, 20 Drawing Sheets

U.S. PATENT DOCUMENTS

| | | |
|---|---|---|
| 3,195,670 A | 7/1965 | Dunn |
| 3,210,092 A | 10/1965 | Kraus et al. |
| 3,573,877 A | 4/1971 | Locke |
| 3,580,591 A | 5/1971 | Coffey |
| 3,589,700 A | 6/1971 | Ruet et al. |
| 3,592,282 A | 7/1971 | Soileau |
| 3,602,522 A | 8/1971 | Zamotin |
| 3,661,228 A | 5/1972 | Glasser |
| 3,664,450 A | 5/1972 | Udden et al. |
| 3,682,462 A | 8/1972 | Papousek |
| 3,709,313 A | 1/1973 | James |
| 3,848,883 A | 11/1974 | Breacain |
| 3,862,751 A | 1/1975 | Schwaller |
| 3,876,012 A | 4/1975 | Regier |
| 3,883,153 A | 5/1975 | Singh et al. |
| 3,901,527 A | 8/1975 | Danziger et al. |
| 3,905,437 A | 9/1975 | Kaiho et al. |
| 3,917,312 A | 11/1975 | Rodaway |
| 3,952,822 A | 4/1976 | Udden et al. |
| 3,953,054 A | 4/1976 | Udden et al. |
| 3,976,152 A | 8/1976 | Bell |
| 4,108,449 A | 8/1978 | Rhodes |
| 4,118,020 A | 10/1978 | Myers |
| 4,119,163 A | 10/1978 | Ball |
| 4,128,137 A | 12/1978 | Booth |
| 4,222,449 A | 9/1980 | Feliz |
| 4,264,085 A | 4/1981 | Volin |
| 4,310,167 A | 1/1982 | McLaurin |
| 4,333,681 A | 6/1982 | Nelson |
| 4,337,958 A | 7/1982 | Witt et al. |
| 4,341,278 A | 7/1982 | Meyer |
| 4,375,295 A | 3/1983 | Volin |
| 4,437,678 A | 3/1984 | Schultz |
| 4,455,029 A | 6/1984 | Taylor |
| 4,455,031 A | 6/1984 | Hosaka |
| 4,483,407 A | 11/1984 | Iwamoto et al. |
| 4,500,102 A | 2/1985 | Havry et al. |
| 4,513,832 A | 4/1985 | Engman |
| 4,545,593 A | 10/1985 | Farnam |
| 4,545,616 A | 10/1985 | Booth |
| 4,556,229 A | 12/1985 | Bihler et al. |
| 4,565,385 A | 1/1986 | Morford |
| RE32,242 E | 9/1986 | Minnebraker |
| 4,618,155 A | 10/1986 | Jayne |
| 4,687,068 A | 8/1987 | Pagett |
| 4,720,223 A | 1/1988 | Neights et al. |
| 4,721,322 A | 1/1988 | Hawkins |
| 4,759,418 A | 7/1988 | Goldenfeld et al. |
| 4,805,712 A | 2/1989 | Singleton |
| 4,811,966 A | 3/1989 | Singleton |
| 4,823,900 A | 4/1989 | Farnam |
| 4,826,194 A | 5/1989 | Sakita |
| 4,840,394 A | 6/1989 | Bickler |
| 4,861,056 A | 8/1989 | Duffy, Jr. et al. |
| 4,862,983 A | 9/1989 | Kreft |
| 4,886,294 A | 12/1989 | Nahachewski |
| 4,905,972 A | 3/1990 | Scowen |
| 4,919,441 A | 4/1990 | Marier et al. |
| 4,926,952 A | 5/1990 | Farnam |
| 4,934,626 A | 6/1990 | Kimura |
| 4,962,942 A | 10/1990 | Barnett et al. |
| 5,123,495 A | 6/1992 | Littlejohn et al. |
| 5,176,393 A | 1/1993 | Robertson et al. |
| 5,180,275 A | 1/1993 | Czech et al. |
| 5,183,133 A | 2/1993 | Roy et al. |
| 5,222,567 A | 6/1993 | Broadhead et al. |
| 5,228,709 A | 7/1993 | Kao |
| 5,230,522 A | 7/1993 | Gehlsen et al. |
| 5,241,876 A | 9/1993 | Mathis |
| 5,248,007 A | 9/1993 | Watkins et al. |
| 5,290,055 A | 3/1994 | Treat, Jr. |
| 5,294,141 A | 3/1994 | Mentessi et al. |
| 5,316,328 A | 5/1994 | Bussinger |
| 5,341,533 A | 8/1994 | Seitz |
| 5,351,774 A | 10/1994 | Okamoto |
| 5,372,211 A | 12/1994 | Wilcox et al. |
| 5,435,404 A | 7/1995 | Gorin, III |
| 5,447,317 A | 9/1995 | Gehlsen et al. |
| 5,467,838 A | 11/1995 | Wu |
| 5,482,261 A | 1/1996 | Ortega |
| 5,513,875 A | 5/1996 | Tahara et al. |
| 5,518,081 A | 5/1996 | Thibodeau |
| 5,531,284 A | 7/1996 | Okamoto |
| 5,540,297 A | 7/1996 | Meier |
| 5,562,172 A | 10/1996 | Mick |
| 5,564,512 A | 10/1996 | Scheulderman |
| 5,575,348 A | 11/1996 | Goertzen et al. |
| 5,611,555 A | 3/1997 | Vidal |
| 5,727,802 A | 3/1998 | Garven, Jr. et al. |
| 5,772,237 A | 6/1998 | Finch et al. |
| D397,645 S | 9/1998 | Schaffner |
| 5,833,248 A | 11/1998 | Eguchi |
| 5,848,658 A | 12/1998 | Pulver |
| 5,851,019 A | 12/1998 | Gill et al. |
| 5,853,059 A | 12/1998 | Goertzen et al. |
| D404,693 S | 1/1999 | Schaffner et al. |
| 5,855,387 A | 1/1999 | Gill et al. |
| 5,899,475 A | 5/1999 | Verhaeg et al. |
| 5,904,214 A | 5/1999 | Lin |
| 5,944,131 A | 8/1999 | Schaffner et al. |
| 5,954,351 A | 9/1999 | Koschinat |
| 5,964,473 A | 10/1999 | Degonda et al. |
| 6,003,624 A | 12/1999 | Jorgensen et al. |
| 6,041,876 A | 3/2000 | Pulver et al. |
| 6,047,979 A | 4/2000 | Kraft et al. |
| 6,062,600 A | 5/2000 | Kamen et al. |
| 6,070,898 A | 6/2000 | Dickie et al. |
| 6,079,698 A | 6/2000 | Patterson et al. |
| 6,079,725 A | 6/2000 | Lazaros |
| D429,665 S | 8/2000 | Dickie |
| 6,129,165 A | 10/2000 | Schaffner et al. |
| 6,131,679 A | 10/2000 | Pulver et al. |
| 6,176,335 B1 | 1/2001 | Schaffner et al. |
| 6,179,076 B1 | 1/2001 | Fernie et al. |
| 6,186,252 B1 | 2/2001 | Schaffner et al. |
| 6,196,343 B1 | 3/2001 | Strautnieks |
| 6,199,647 B1 | 3/2001 | Schaffner et al. |
| 6,206,119 B1 | 3/2001 | Wu |
| 6,209,670 B1 | 4/2001 | Fernic et al. |
| 6,225,894 B1 | 5/2001 | Kyrtsos |
| 6,234,263 B1 | 5/2001 | Boivin et al. |
| 6,234,507 B1 | 5/2001 | Dickie et al. |
| 6,279,927 B1 | 8/2001 | Nishihira et al. |
| 6,312,000 B1 | 11/2001 | Pauls et al. |
| 6,322,089 B1 | 11/2001 | Dantele et al. |
| 6,341,657 B1 | 1/2002 | Hopely et al. |
| 6,341,671 B1 | 1/2002 | Ebersole |
| 6,347,688 B1 | 2/2002 | Hall et al. |
| 6,357,793 B1 | 3/2002 | Dickie et al. |
| 6,405,816 B1 | 6/2002 | Kamen et al. |
| 6,428,020 B1 | 8/2002 | Steadman |
| 6,454,286 B1 | 9/2002 | Hosino |
| 6,460,641 B1 | 10/2002 | Kral |
| 6,460,869 B1 | 10/2002 | Tremouilles |
| 6,533,305 B1 | 3/2003 | Falk |
| 6,533,306 B2 | 3/2003 | Watkins |
| 6,543,564 B1 | 4/2003 | Kamen et al. |
| 6,543,798 B2 | 4/2003 | Schaffner et al. |
| 6,554,086 B1 | 4/2003 | Goertzen et al. |
| 6,568,030 B1 | 5/2003 | Watanabe et al. |
| 6,581,711 B1 | 6/2003 | Tuluie |
| 6,588,799 B1 | 7/2003 | Sanchez |
| 6,640,916 B2 | 11/2003 | Schaffner |
| 6,688,437 B2 | 2/2004 | Usherovich |

| 6,715,845 B2 | 4/2004 | Kamen et al. |
| 6,923,280 B2 | 8/2005 | Goertzen et al. |
| 6,935,448 B2 | 8/2005 | Goertzen et al. |
| 7,066,290 B2 | 6/2006 | Fought |
| 7,100,716 B2 | 9/2006 | Engels et al. |
| 7,219,755 B2 | 5/2007 | Goertzen et al. |
| 7,374,002 B2 | 5/2008 | Fought |
| 2003/0122332 A1 | 7/2003 | Engels et al. |
| 2004/0032119 A1 | 2/2004 | Tran et al. |
| 2005/0225040 A1 | 10/2005 | Goertzen et al. |
| 2006/0021806 A1 | 2/2006 | Goertzen et al. |

FOREIGN PATENT DOCUMENTS

| DE | 10136368 A1 | 2/2003 |
| DE | 10136368 C2 | 2/2003 |
| DE | 10136369 A1 | 2/2003 |
| DE | 10136369 C2 | 2/2003 |
| EP | 127 929 | 12/1984 |
| EP | 445 171 B1 | 9/1991 |
| EP | 677 285 | 10/1995 |
| EP | 908 165 | 4/1999 |
| EP | 908 166 | 4/1999 |
| EP | 988 848 | 3/2000 |
| EP | 1 279 391 | 1/2003 |
| EP | 1 279 392 | 1/2003 |
| FR | 2399822 | 3/1979 |
| FR | 2498925 | 8/1982 |
| JP | 58-48304 | 3/1983 |
| JP | 04-158864 | 6/1992 |
| JP | 07-328073 | 12/1995 |
| JP | 08-038552 | 2/1996 |
| JP | 410248877 | 9/1998 |
| JP | 2000 102569 | 4/2000 |
| JP | 2000 288032 | 10/2000 |
| JP | 2001 070347 | 3/2001 |
| JP | 2001 104391 | 4/2001 |
| JP | 2001 212181 | 8/2001 |
| JP | 2001 258948 | 9/2001 |
| JP | 2001 327545 | 11/2001 |
| JP | 2002 143223 | 5/2002 |
| JP | 2002 165841 | 6/2002 |
| WO | WO82/00445 | 2/1982 |
| WO | WO84/04451 | 11/1984 |
| WO | WO90/06097 | 6/1990 |
| WO | WO92/09463 | 6/1992 |
| WO | WO93/24342 | 12/1993 |
| WO | WO96/15752 | 5/1996 |
| WO | WO98/46184 | 10/1998 |
| WO | WO 00/08910 | 2/2000 |
| WO | WO 00/09356 | 2/2000 |
| WO | WO 00/12040 | 3/2000 |
| WO | WO 00/66060 | 11/2000 |
| WO | WO 02/34190 | 5/2002 |
| WO | WO 03/030800 | 4/2003 |
| WO | WO 03/034969 | 5/2003 |

OTHER PUBLICATIONS

"Bounder Plus Power Wheelchair: Convention "Tubular" Style Frame"; http://www.wheelchairs.com/plus.htm, Accessed on the World Wide Web on Dec. 17, 2003, p. 1-4.
"Frog Legs; Smoot Ride Ahead"; http://www.froglegsinc.com/index. php, Accessed on the World Wide Web on Dec. 17, 2003, p. 105.
"Frog Legs Tires", http://mdtap.org/tt/1999.09/prod.html, Accessed on the World Wide Web on Dec. 17, 2003, p. 1-3.
"Invacare pronto M7I jr. Power Wheelchair Manual"; Accessed on the World Wide Web on Dec. 17, 2003.
"Invacare Storm Series TDX Power Wheelchairs Manual"; Accessed on the World Wide Web on Dec. 17, 2003, p. 1-24.
"Invacare Xterra Series GT Power Wheelchair Manual", Accessed on the World Wide Web on Dec. 17, 2003, p. 1-4.
"Jazzy 1122", Pride Mobile Products Corp., Accessed on the World Wide Web on Dec. 17, 2003, p. 1-2.
"Jazzy 1133", Pride Mobile Products Corp., Accessed on the World Wide Web on Dec. 17, 2003, p. 1-2.
"Jazzy 1170XL", Pride Mobile Products Corp., Accessed on the World Wide Web on Dec. 17, 2003, p. 1-2.
"Bruno Independent Living Aids ISP 9001 Certified"; http://www.bruno.com/power_chairs.htm, Accessed on the World Wide Web on Dec. 17, 2003, p. 1-5 Top End Terminator SS Sp.
"Top End Terminator SS Sports Wheelchair", http://phc-online.com/terminator_ss.htm, Accessed on the World Wide Web on Dec. 17, 2003, p. 1-5.
"Transactions of the Institute of Measurement and Control", The British Library of Science Technology and Business, vol. 24, Nov. 5, 2002, 15 pgs.
M.J. Lawn, et al., "Modeling of a Stair-Climbing Wheelchair Mechanism with High Single-Step Capability", IEEE Transactions on Neutral Systems and Rehabilitation Engineering, V.
Quickie G-424 User Instruction Manual & Warranty, 930484 Rev. A (27 sheets) (alleged date not later than 2000).
10 photographs (8.5×11) of Quickie G-424 Wheelchair obtained Nov. 24, 2004.
Sunrise Medical, Inc., Power Products Parts Manual, 930307 Rev. K (264 double sided sheets), Jul. 2004. (Note: various dates are alleged therein based on wheelchair products listed including the Quickie G-424).
International Search Report from PCT/US98/07543 which cites FR 2399822.
U.S. Patent Office action dated Nov. 27, 2001 from U.S. Appl. No. 09/698,481.
U.S. Patent Office action dated Jun. 27, 2002 from U.S. Appl. No. 09/698,481.
U.S. Patent Office Advisory action dated Nov. 13, 2002 from U.S. Appl. No. 09/698,481.
U.S. Patent Office action dated Aug. 8, 2003 from U.S. Appl. No. 10/390,133.
U.S. Patent Office action dated Jun. 16, 2004 from U.S. Appl. No. 10/390,133.
U.S. Patent Office action dated Aug. 8, 2003 from U.S. Appl. No. 10/390,386.
U.S. Patent Office action dated Jan. 28, 2004 from U.S. Appl. No. 10/390,386.
U.S. Patent Office action dated Oct. 12, 2004 from U.S. Appl. No. 10/390,386.
U.S. Patent Office action dated Sep. 8, 2006 from U.S. Appl. No. 11/145,477.
U.S. Patent Office action dated Jul. 25, 2006 from U.S. Appl. No. 11/209,001.
International Search Report from PCT/US01/42656.
Office action mailed Mar. 28, 2006 form U.S. Appl. No. 11/145,477.
Complaint for Patent Infringement Demand for Jury Trial, Case No. 1:06CV0517.
Office action mailed Feb. 2, 2006 from Control No. 90/007,491.
Office action mailed Jul. 5, 2006 from Control. No. 90/007,491.
Office action mailed Sep. 21, 2006 from Control No. 90/007,491.
"All-Terrain Wheelchair, Designer's Corner", Design News, Feb. 24, 1992, cover page and p. 54.
Request for Reexamination of U.S. Appl. No. 6,196,343, filed Apr. 28, 2006, 17 pgs.
Affidavit, executed Apr. 3, 2006 by Mark Sullivan, Invacare Corporation Vice President of Rehab Submitted in reexamination Control No. 90/007,491, 5 pgs.
Affidavit, executed Apr. 3, 2006 by Gerold Goertzen Invacare Corporation Director of Research & Development submitted in reexamination Control No. 90/007,491, 7 pgs.
Amendment dated Apr. 9, 2002 submitted during prosecution of U.S. Appl. No. 6,554,086, 21 pgs.
Office Action from U.S. Appl. No. 11/474,834, mailed Mar. 21, 2007, 7 pgs.
Office Action from U.S. Appl. No. 11/209,001, mailed Nov. 08, 2006, 27 pgs.
Notice of Allowance from U.S. Appl. No. 11/145,477, dated Apr. 09, 2007, 7 pgs.
Office Action from U.S. Appl. No. 11/474,834, dated Mar. 21, 2007, 16 pgs.

Office Action from U.S. Appl. No. 10/444,826, dated Apr. 29, 2003, 6 pgs.
Notice of Allowance from related U.S. Appl. No. 09/698,481, mailed Dec. 12, 2002.
Notice of Allowance from related U.S. Appl. No. 10/390,386, mailed Apr. 7, 2005.
Notice of Allowance from related U.S. Appl. No. 10/390,133, mailed Apr. 11, 2005.
Office action from related U.S. Appl. No. 10/390,133, mailed Mar. 30, 2005.
International Search Report, Written Opinion and International Preliminary Examination report from PCT/US02/29996, mailed Dec. 09, 2002, 16 pgs.
Office action from U.S. Appl. No. 11/474,834 dated Sep. 20, 2007.
Notice of Allowance from U.S. Appl. No. 11/474,834 dated Jan. 17, 2008.
Office action from U.S. Appl. No. 10/044,826 dated Apr. 29, 2003.
Amendment from U.S. Appl. No. 10/044,826 dated Oct. 29, 2003.
Amendment from U.S. Appl. No. 10/390,133 dated Feb. 9, 2004.
Amendment after Final from U.S. Appl. No. 10/390,133 dated Dec. 16, 2004.
Amendment from U.S. Appl. No. 10/390,386 dated Nov. 10, 2003.
Amendment from U.S. Appl. No. 10/390,386 dated May 28, 2004.
Amendment from U.S. Appl. No. 10,390,386 dated Mar. 14, 2005.
Response to Office action from U.S. Appl. No. 11/145,477 dated Dec. 8, 2006.
Amendment and Response to Office action from U.S. Appl.l No. 11/474,834 dated Jun. 26, 2007.
Amendment and Response to Office action from U.S. Appl. No. 11/474,834 dated Nov. 20, 2007.
Interview Summary from U.S. Appl. No. 90/007,491 dated Mar. 23, 2006.
Statement as to the Substance of an Interview from U.S. Appl. No. 90/007,491 dated Apr. 3, 2006.
Response to Office action from U.S. Appl. No. 90/007,491 dated Apr. 3, 2006.
Response to Office action from U.S. Appl. No. 90/007,491 dated Sep. 5, 2006.
Advisory Action from U.S. Appl. No. 90/007,491 dated Sep. 21, 2006.
Response to Office action from U.S. Appl. No. 90/007,491 dated Nov. 6, 2006.
Notice of Appeal from U.S. Appl. No. 90/007,491 dated Nov. 6, 2006.
Advisory action from U.S. Appl. No. 90/007,491 dated Nov. 22, 2006.
Appeal Brief from U.S. Appl. No. 90/007,491 dated Jan. 16, 2007.
Advisory Action from U.S. Appl. No. 90/007,491 dated Apr. 20, 2007.
Amended Appeal Brief from U.S. Appl. No. 90/007,491 dated May 21, 2007.
Examiner's Answer from U.S. Appl. No. 90/007,491 dated Sep. 24, 2007.
Reply Brief from U.S. Appl. No. 90/007,491 dated Nov. 21, 2007.
Supplemental Examiner's Answer from U.S. Appl. No. 90/007,491 dated Dec. 18, 2007.
Request for Oral Hearing from U.S. Appl. No. 90/007,491 dated Feb. 19, 2008.
Reply Bried from U.S. Appl. No. 90/007,491 dated Feb. 19, 2008.
Office communication from U.S. Appl. No. 90/007,491 dated Mar. 14, 2008.
Office communication from U.S. Appl. No. 90/007,491 dated Jul. 3, 2008.
Notice of Hearing from U.S. Appl. No. 90/007,491 dated Aug. 22, 2008.
Hearing Attendance Confirmation from U.S. Appl. No. 90/007,491 dated Sep. 12, 2008.
Record of Oral Hearing from U.S. Appl. No. 90/007,491 dated Nov. 13, 2008.
Decision on Appeal from U.S. Appl. No. 90/007,491 dated Nov. 19, 2008.
Amendment After Final from U.S. Appl. No. 09/698,481 dated Nov. 27, 2002.
Amendment After Final from U.S. Appl. No. 09/698,481 dated Oct. 24, 2002.
Amendment a from U.S. Appl. No. 09/698,481 dated Mar. 27, 2002.

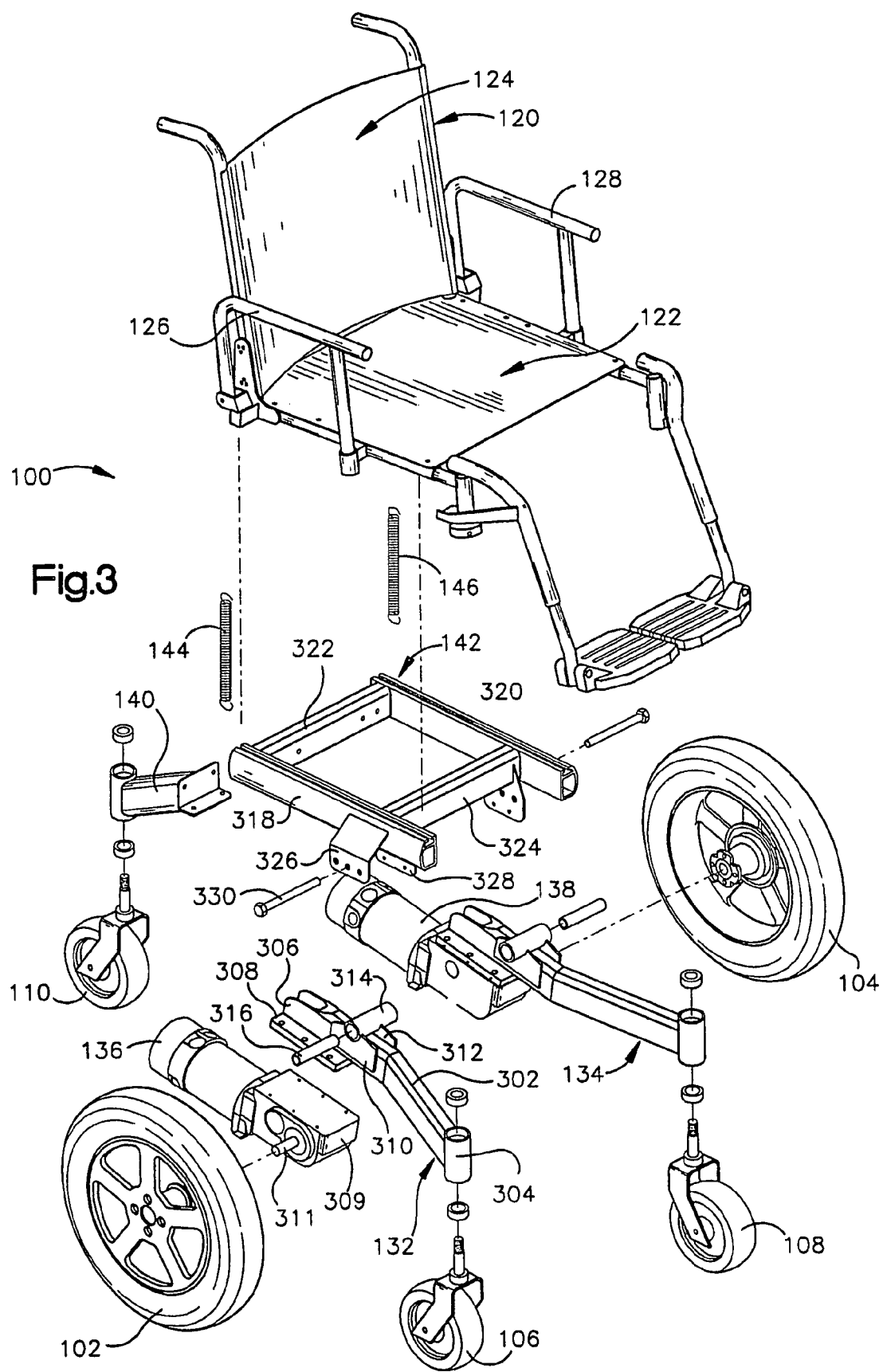

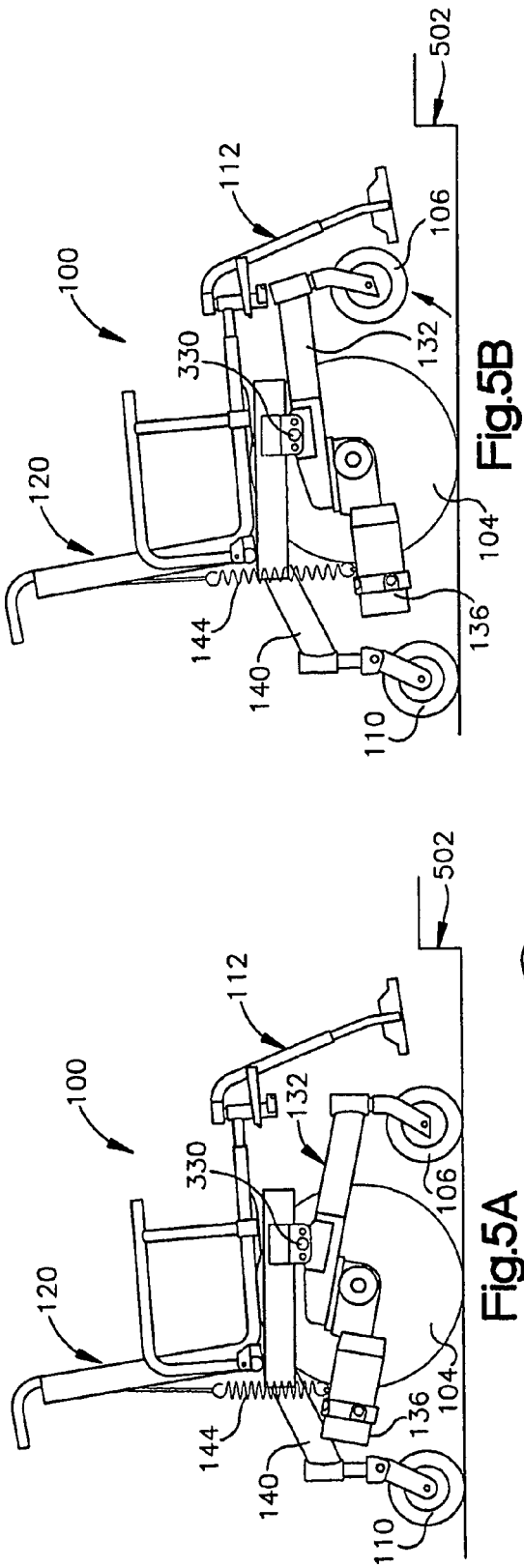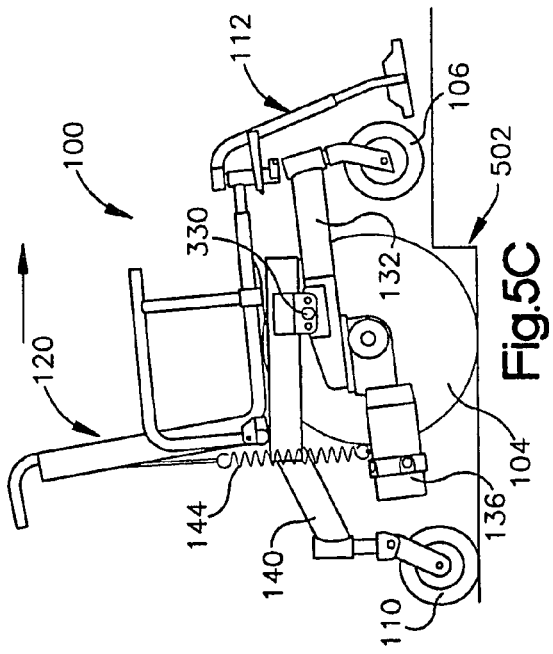

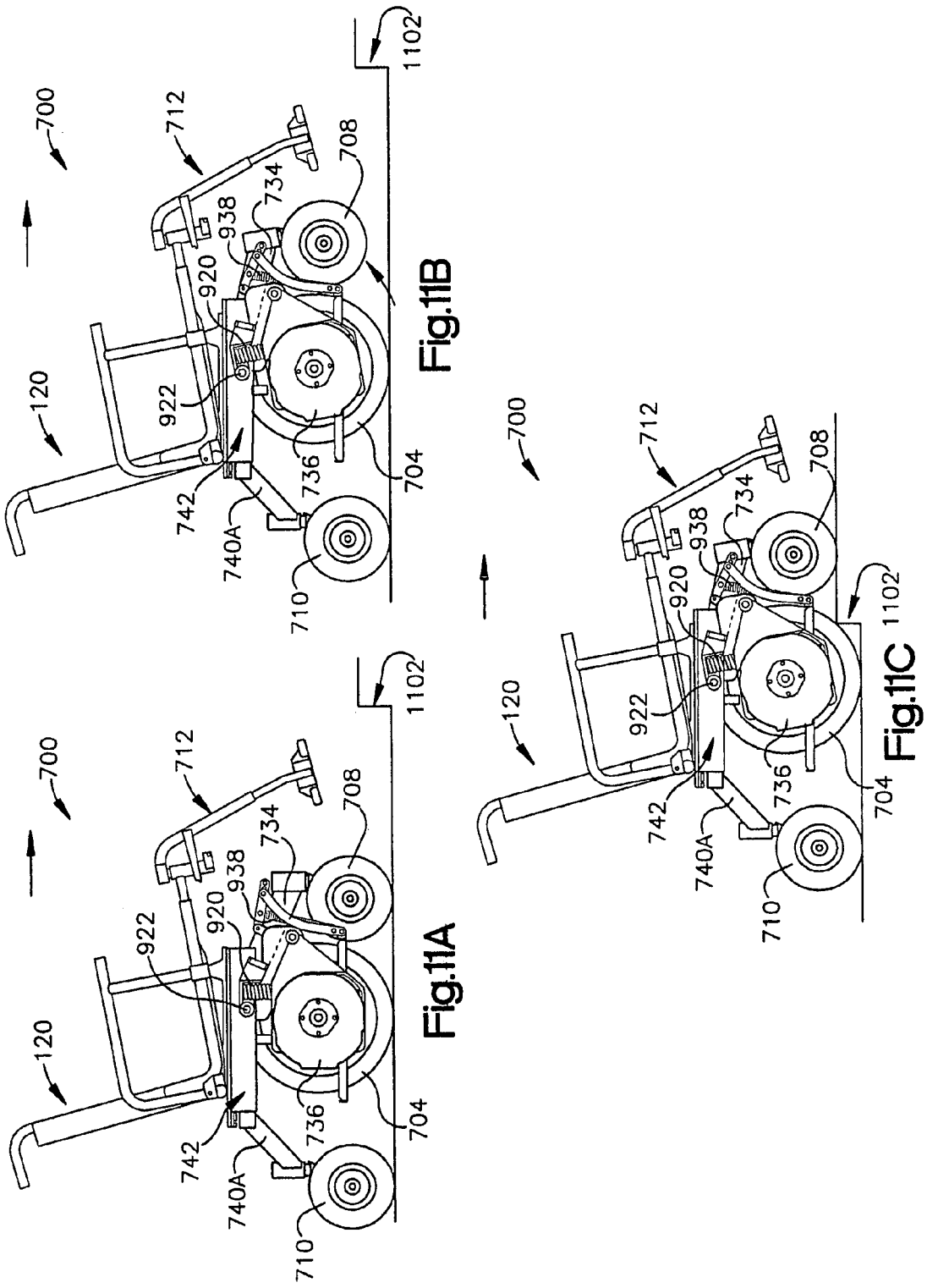

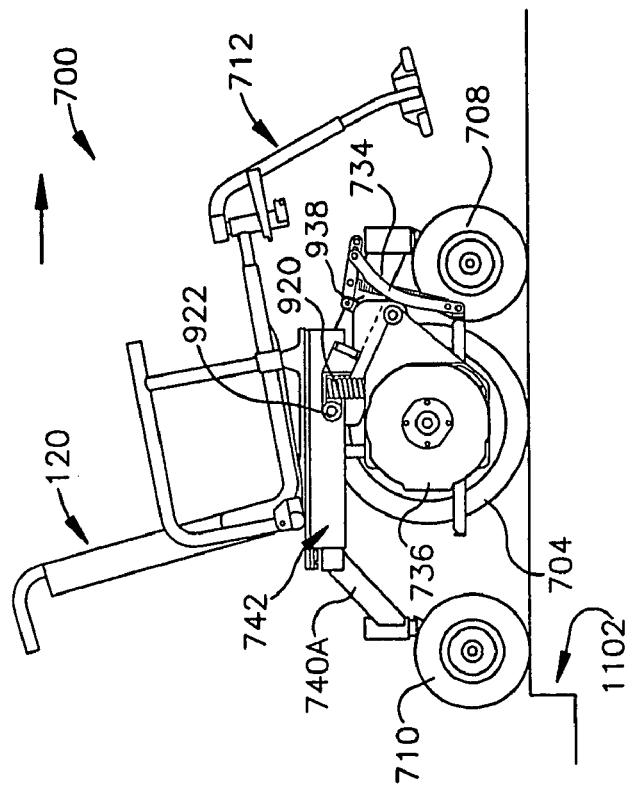
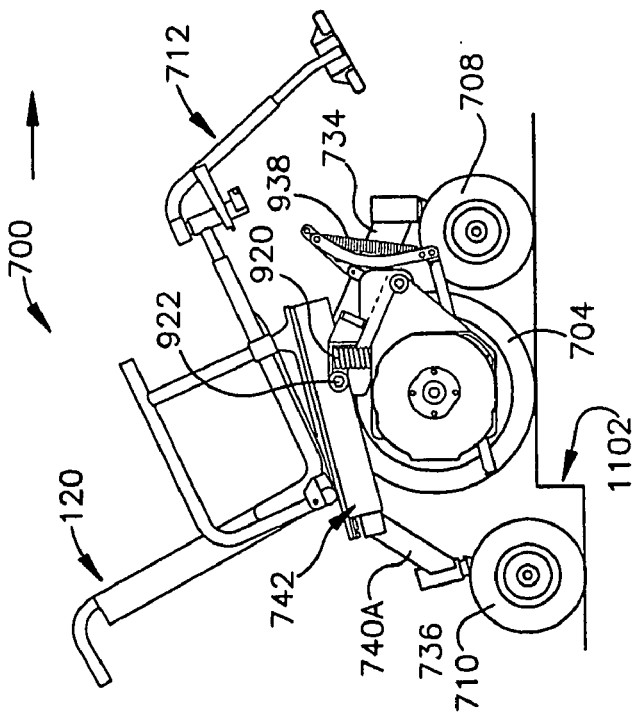
Fig. 11E
Fig. 11D

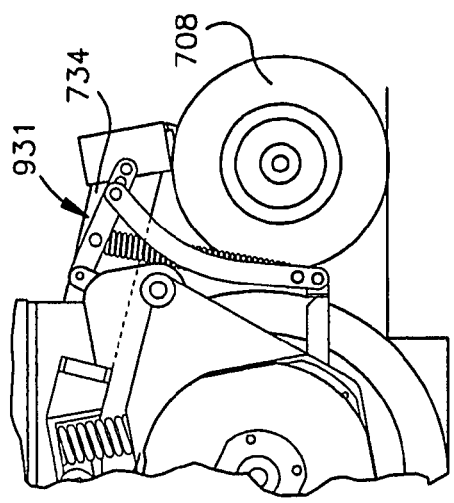
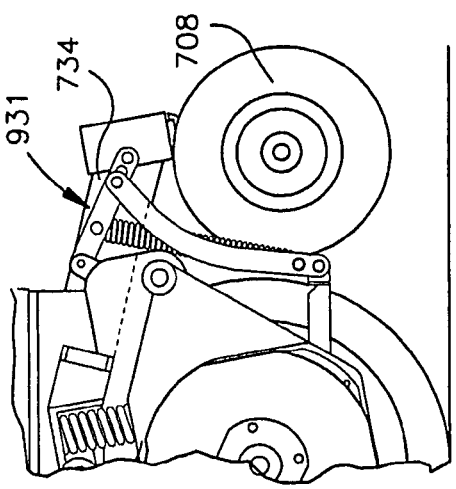
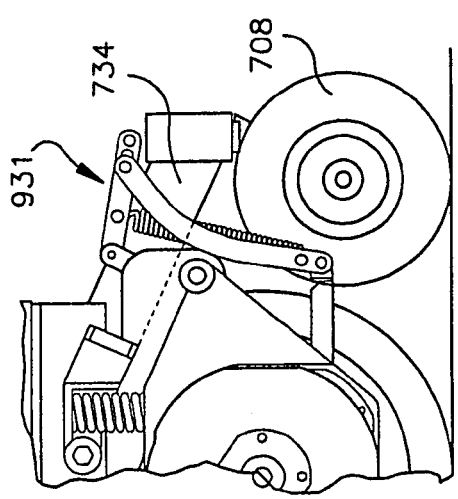
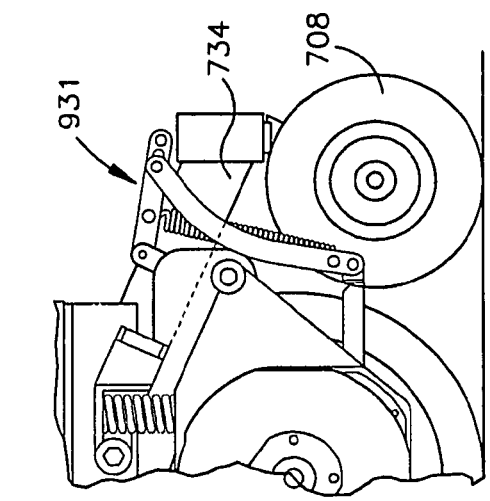
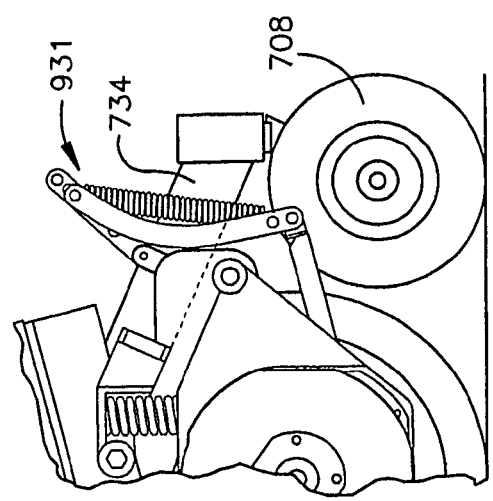

OBSTACLE TRAVERSING WHEELCHAIR

CROSS REFERENCES TO RELATED APPLICATIONS

This patent application is a continuation of U.S. patent application Ser. No. 11/209,001 filed Aug. 22, 2005, which is a continuation of U.S. patent application Ser. No. 10/390,386, filed Mar. 17, 2003 now U.S. Pat. No. 6,935,448 which is a continuation of U.S. patent application Ser. No. 09/698,481, filed on Oct. 27, 2000 now U.S. Pat. No. 6,554,086, and titled "Obstacle Traversing Wheelchair" and U.S. patent application Ser. No. 11/145,477, filed Jun. 3, 2005 now U.S. Pat. No. 7,219,755 is a continuation of U.S. Ser. No. 10/390,133, filed Mar. 17, 2003 now U.S. Pat. No. 6,923,280 which is a divisional of said 09/698,481, filed Oct. 27, 2000 now U.S. Pat. No. 6,554,086.

FIELD OF THE INVENTION

The invention relates generally to wheelchairs, and more particularly, to a wheelchair having pivotal assemblies for traversing obstacles such as curbs and the like.

BACKGROUND OF THE INVENTION

Wheelchairs are an important means of transportation for a significant portion of society. Whether manual or powered, wheelchairs provide an important degree of independence for those they assist. However, this degree of independence can be limited if the wheelchair is required to traverse obstacles such as, for example, curbs that are commonly present at sidewalks, driveways, and other paved surface interfaces.

In this regard, most wheelchairs have front and rear casters to stabilize the chair from tipping forward or backward and to ensure that the drive wheels are always in contact with the ground. One such wheelchair is disclosed in U.S. Pat. No. 5,435,404 to Garin. On such wheelchairs, the caster wheels are typically much smaller than the driving wheels and located both forward and rear of the drive wheels. Though this configuration provided the wheelchair with greater stability, it made it difficult for such wheelchairs to climb over obstacles such as, for example, curbs or the like, because the front casters could not be driven over the obstacle due to their small size and constant contact with the ground.

U.S. Pat. No. 5,964,473 to Degonda et al. describes a wheelchair having front and rear casters similar to Garin and a pair of additional forward lift wheels. The lift wheels are positioned off the ground and slightly forward of the front caster. Configured as such, the lift wheels first engage a curb and cause the wheelchair to tip backwards. As the wheelchair tips backwards, the front caster raises off the ground to a height so that it either clears the curb or can be driven over the curb.

While Degonda et al. addressed the need of managing a front caster while traversing an obstacle such as a curb, Degonda et al. is disadvantageous in that additional wheels (i.e., lift wheels) must be added to the wheelchair. Hence, it is desirable to provide a wheelchair that does not require additional lift wheels or other similar type mechanisms to raise a front caster off the ground to a height so that the caster either clears an obstacle or can be driven over the obstacle.

SUMMARY OF THE INVENTION

According to one embodiment of the present invention, a wheelchair suspension is provided. The wheelchair suspension includes a frame, a pivot arm, a front caster, a drive assembly, and a rear caster. The pivot arm is pivotally coupled to the frame. The front caster is coupled to the pivot arm. Movement of the drive assembly in a first direction causes the pivot arm to substantially remain in a first position. Movement of the drive assembly in a second direction urges the pivot arm away from the first position.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIG. 3 is an exploded perspective view of certain components of the first embodiment.

FIGS. 5A, 5B, 5C, 5D, and 5E sequentially illustrate the curb-climbing operation of the first embodiment.

FIGS. 11A, 11B, 11C, 11D, and 11E sequentially illustrate the curb-climbing operation of the second embodiment.

FIGS. 12A, 12B, 12C, 12D, and 12E correspond to enlarge portions of FIGS. 11A, 113, 11C, 11D, and 11E, respectively, particularly showing the sequential range of motion of a front resilient assembly of the present invention.

DETAILED DESCRIPTION OF ILLUSTRATED EMBODIMENTS

Figure 1:
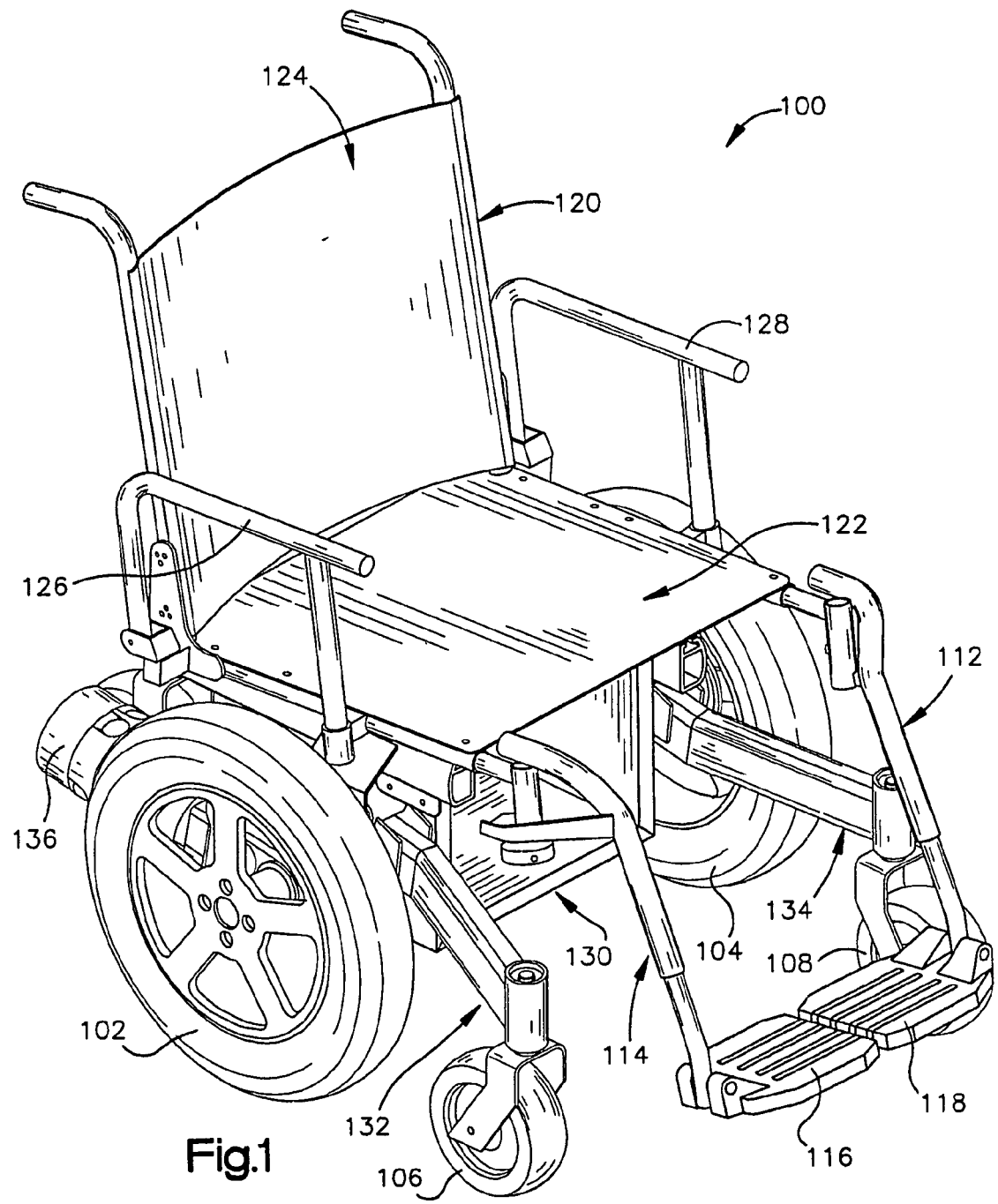
FIGS. 1 and 2A are front and rear perspective views, respectively, of a first embodiment of a wheelchair of the present invention.
Figure 2A:
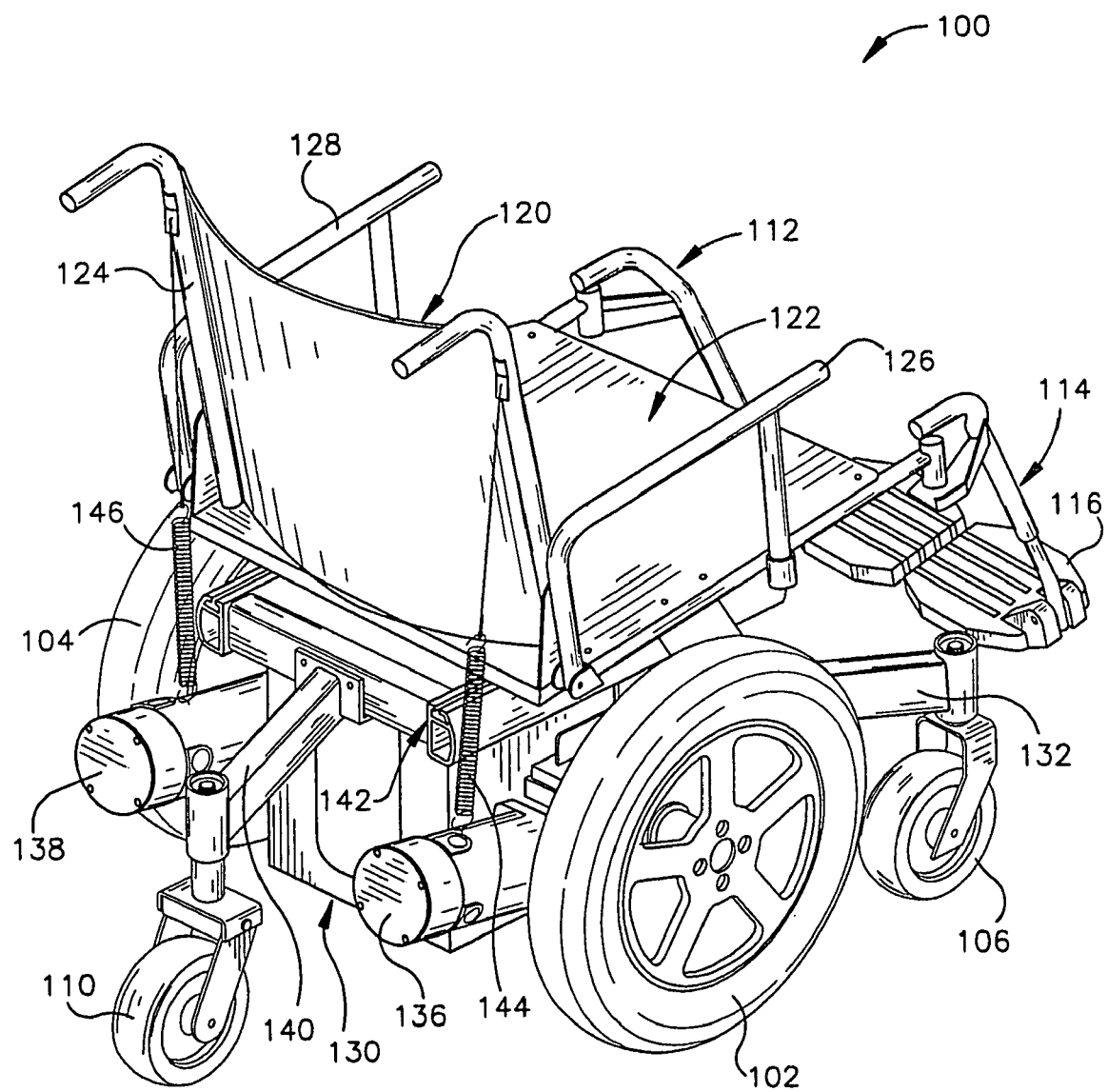

Referring now to the drawings, and more particularly to FIGS. 1 and 2A, perspective views of a wheelchair 100 of the present invention are shown. The wheelchair 100 has a pair of drive wheels 102. and 104, front casters 106 and 108, rear caster 110, and front riggings 112 and 114. The front riggings 112 and 114 include footrests 116 and 118 for supporting the feet of a passenger. The front riggings 112 and 114 are preferably mounted so as to be able to swing away from the shown center position to the sides of wheelchair 100. Additionally, footrests 116 and 118 can swing from the shown horizontal-down position to a vertical-up position thereby providing relatively unobstructed access to the front of wheelchair 100.

The wheelchair 100 further includes a chair 120 having a seat portion 122 and a back portion 124 for comfortably seating a passenger. Chair 120 is adjustably mounted to frame 142 so as to be able to move forward and backward on frame 142, thereby adjusting the passenger's weight distribution and center of gravity relative to the wheelchair. In the most preferred embodiment, chair 120 should be positioned such that a substantial portion of the wheelchair's weight when loaded with a passenger is generally above and evenly distributed between drive wheels 102 and 104. For example, the preferred weight distribution of wheelchair 100 when loaded with a passenger should be between 80% to 95% (or higher) on drive wheels 102 and 104. The remainder of the weight being distributed between the front and rear casters. Armrests 126 and 128 are also provided for resting the arms of a passenger or assisting a passenger in seating and unseating from chair 120.

The wheelchair 100 is preferably powered by one or more batteries 130, which reside beneath the chair 120 and in-between drive wheels 102 and 104. A pair of drive motors 136 and 138 and gearboxes are used to power drive wheels 102 and 104. The motors and their associated transmissions or gearboxes (if any) forming a drive assembly. A control system and controller (not shown) interface batteries 130 to the drive motors 136 and 138 so as to allow a passenger to control the operation of the wheelchair 100. Such operation includes directing the wheelchair's acceleration, deceleration, velocity, braking, direction of travel, etc.

Front casters 106 and 108 are attached to pivot arms 132 and 134, respectively. Rear caster 110 is attached to rear caster arm 140. While only one rear caster is shown, it should be understood that in the alternative two rear casters can also be provided. As will be described in more detail, pivot arms 132 and 134 are pivotally coupled to frame 142 for curb climbing and descending, while rear caster arm 140 is rigidly coupled to frame 142.

Springs 144 and 146 are coupled to the arms 132 and 134 and the frame 142. More specifically, the coupling to arms 132 and 134 is preferably via attachment to the housings of motors 136 and 138, respectively. The coupling to the frame 142 is via attachment to seat back 124. So configured, each spring provides a spring force urging the motor housings upward and the seat 120 or the rearward portion of frame 142 downward.

Figure 2B:
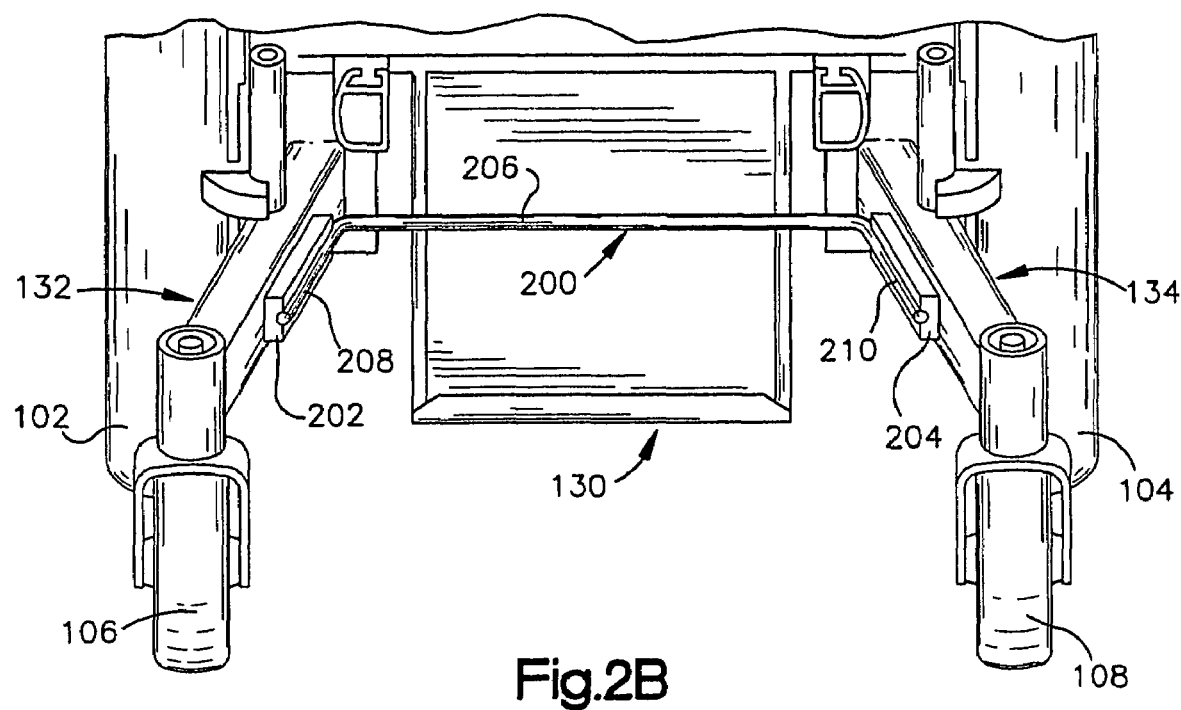
FIG. 2B is a front perspective view of an alternative embodiment of the wheelchair of FIGS. 1 and 2A having a stabilizing torsion element.

FIG. 2B is a partial front perspective view of wheelchair 100 showing a torsion bar 200 of the present invention. Beyond a certain range of motion, torsion bar 200 ensures that arms 132 and 134 influence each other. In this regard, torsion bar 200 has a torsion section 206 and stem sections 208 and 218. Torsion bar 200 is preferably made by taking a stock of spring steel and performing two bends in the stock to form torsion section 206 and stem sections 208 and 210. As shown in FIG. 2B, arms 132 and 134 have attached thereto first and second torsion mounting elements 202 and 204. Each torsion mounting element includes a semi-circular groove therein for accepting a stem section of the torsion bar 200. The torsion bar 200 is held in place within torsion mounting elements 202 and 204 via forced fit within the semi-circular grooves. In operation, arm 132 or 134 is free to independently move (i.e., raise or lower) a limited distance before it influences the other arm via torsion bar 200. More specifically, once the torsion limit of torsion bar 200 is exceeded, it behaves as a substantially rigid member translating any further motion of one arm to the other arm.

The suspension and drive components of wheelchair 100 are further illustrated in the exploded prospective view of FIG. 3. More specifically, pivot arm 132 has a base member 306 and an angled member 302 extending therefrom. The distal end of angled member 302 includes a front swivel assembly 304 that interfaces with a front caster 106. Base member 306 has attached thereto a mounting plate 308 for mounting drive motor 136 and gearbox assembly 309. Drive motor 136 is coupled to pivot arm 132 through gearbox assembly 309 and mounting plate 308. The gearbox assembly 309 interfaces drive motor 136 to drive wheel 102, which is mounted on drive axle 311. The gearbox assembly 309 is preferably attached to mounting plate 308 with screws or bolts and mounting plate 308 is preferably welded to base member 306.

Pivot arm 132 has a pivot mounting structure between base member 306 and angled member 302. The pivot mounting structure includes brackets 310 and 312 and sleeve 314. Brackets 310 and 312 are preferably welded to base member 306 and sleeve 314 is preferably welded to brackets 310 and 312, as shown. A low-friction sleeve 316 is provided for sleeve 314 and is inserted therein.

Frame 142 has longitudinal side members 318 and 320 and cross-brace members 322 and 324. Cross-brace members 322 and 324 are preferably welded to longitudinal side members 318 and 320, as shown. A pair of frame brackets 326 and 328 are preferably welded to longitudinal side member 318. The frame brackets 326 and 328 are spaced apart such that sleeve 314 can be inserted there between and further include guide holes or apertures such that a pin or bolt 330 can be inserted through bracket 326, sleeve 314, and bracket 328. In this manner, pivot arm 132 and its attachments can pivot around bolt 330 and are pivotally mounted to frame 142. Pivot arm 134 is similarly constructed and mounted to frame 142.

Figure 4A:
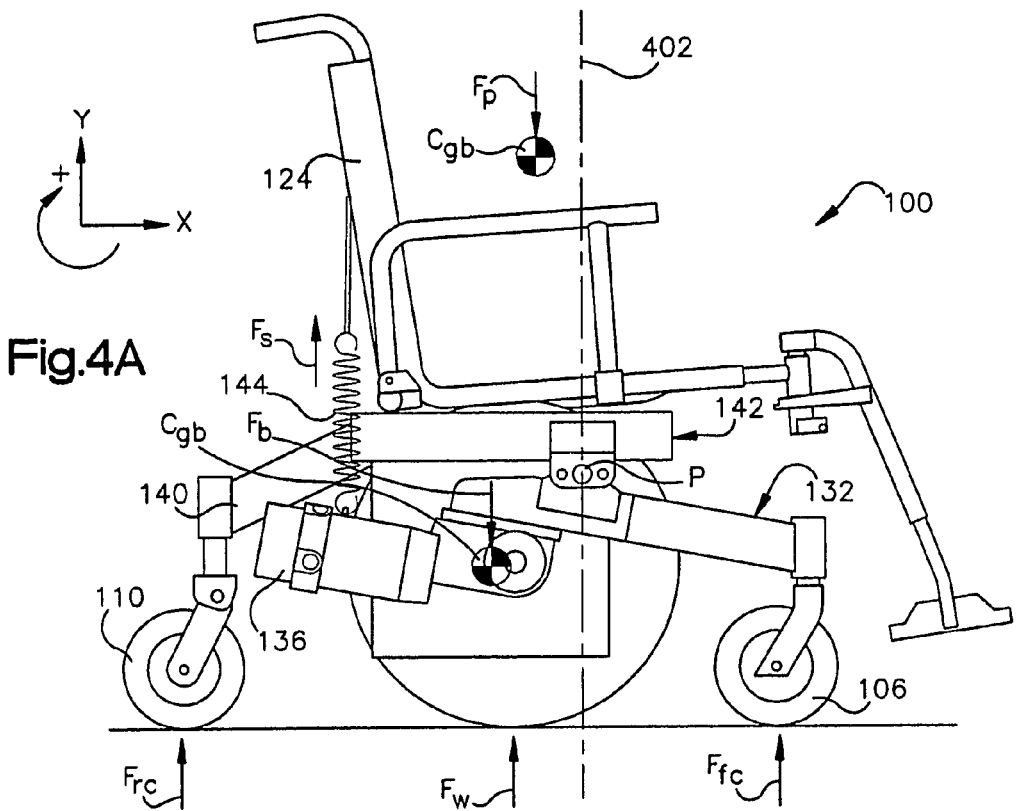
FIGS. 4A, 4B, and 4C are illustrations showing the forces acting on the wheelchair of the first embodiment in the static, accelerating and decelerating mode of operation.
Figure 4B:
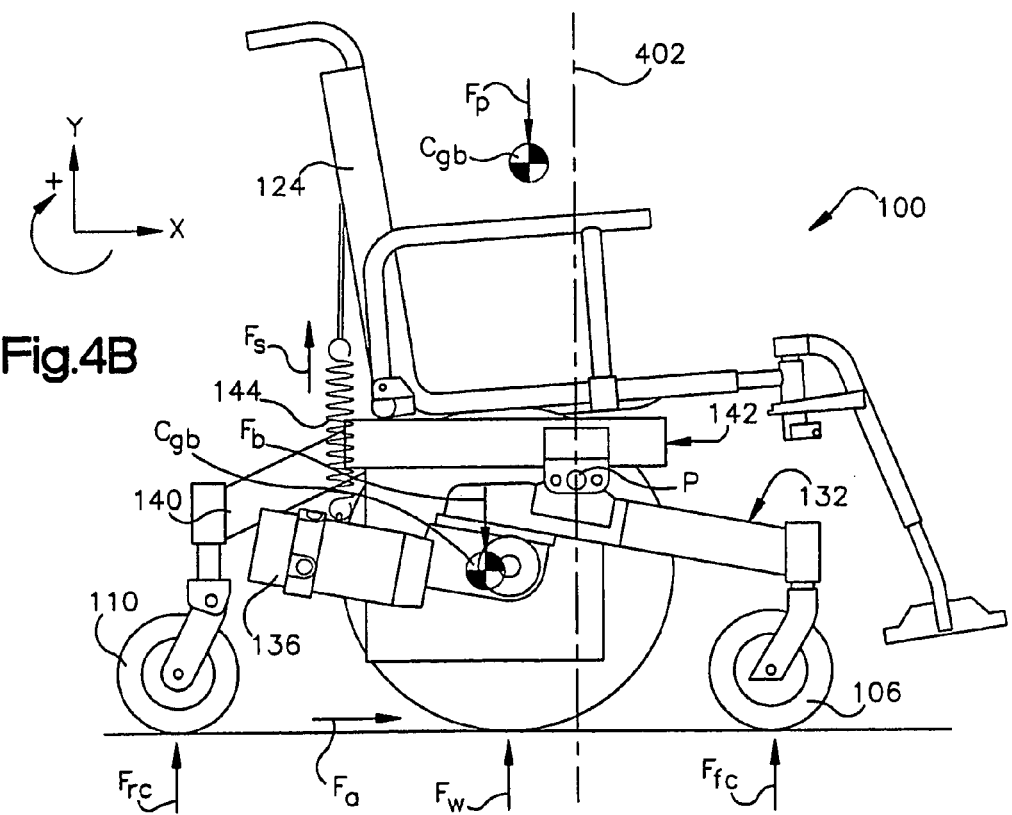
Figure 4C:
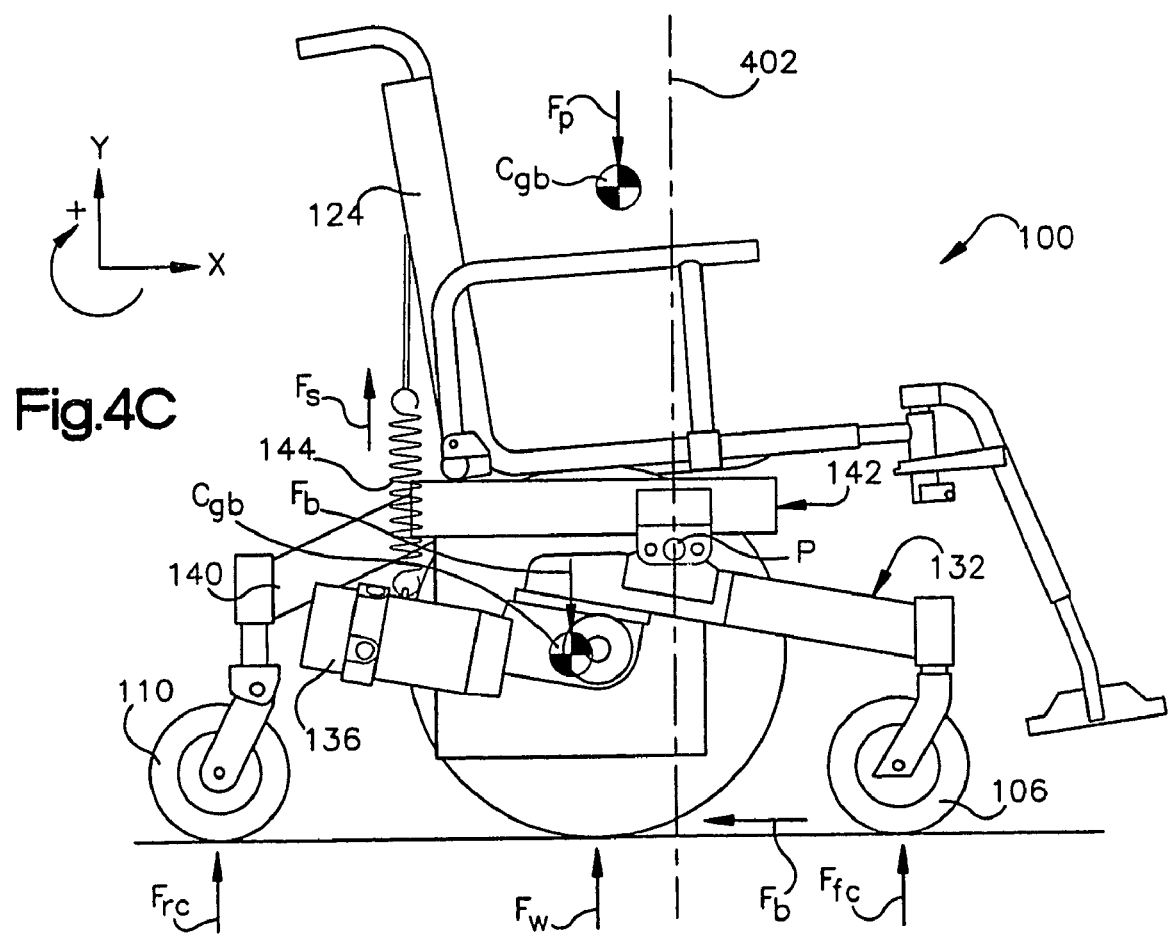

Referring now to FIGS. 4A through 4C, free body diagrams illustrating various centers of gravity and the forces acting on wheelchair 100 will now be described. In particular, FIG. 4A is a free body diagram illustrating the forces acting on wheelchair 100 when the wheelchair is in static equilibrium. The various forces shown include $F_p$, $F_b$, $F_s$, $F_{fc}$, $F_{rc}$, and $F_w$. More specifically, $F_p$ is the force representing gravity acting on the center of gravity of a person $C_{gp}$ sitting in wheelchair 100. Similarly, $F_b$ is the force representing gravity acting on the center of gravity of the batteries $C_{gb}$ used to power wheelchair 100. Resilient member or spring 144 introduces a resilient force $F_s$ acting on pivot arm 132 through its connection to the housing of drive motor 136. A second resilient member or spring 146 (see FIG. 3) provides a similar force on pivot arm 134. Rear caster 110 has a force $F_{rc}$ acting on its point of contact with the ground. Front caster 106 has a force $F_{fc}$ acting on its point of contact with the ground. Front caster 108 (not shown in FIG. 4A) has a similar force acting on it as well. Drive wheel 102 has force $F_w$ acting on its point of contact with the ground and drive wheel 104 also has a similar force acting thereon.

In wheelchair 100, the center of gravity of a person $C_{gp}$ sitting in the wheelchair is preferably located behind a vertical centerline 402 through pivotal connection P. Similarly, the center of gravity of the batteries $C_{gb}$ is located behind the vertical centerline 402. As already described, it is possible to obtain between approximately 80% to 95% weight distribution on drive wheels 102 and 104, with the remainder of the weight being distributed between the front casters 106 and 108 and the rear caster 110. As will be explained in more detail, such an arrangement facilitates the raising and lowering of the front casters 106 and 108 during acceleration and deceleration of the wheelchair 100.

Under static equilibrium such as, for example, when the chair is at rest or not accelerating or decelerating as shown in FIG. 4A, the net rotational moment around pivotal connection P and pivot arms 132 and 134 is zero (0) (i.e., $\Sigma F_n r_n = 0$, where F is a force acting at a distance r from the pivotal connection P and n is the number of forces acting on the wheelchair). Hence, pivot arms 132 and 134 do not tend to rotate or pivot.

In FIG. 4B, wheelchair 100 is shown accelerating. The forces are the same as those of FIG. 4A, except that an acceleration force $F_a$ is acting on drive wheel 102. A similar force acts on drive wheel 104. When the moment generated by the acceleration force $F_a$ exceeds the moment generated by spring force $F_s$, pivot arm 132 will begin to rotate or pivot such that front caster 106 begins to rise. As the moment generated by the acceleration force $F_a$ continues to increase over the moment generated by spring force $F_s$, the pivot arm 132 increasingly rotates or pivots thereby increasingly raising front caster 106 until the maximum rotation or pivot has been achieved. The maximum rotation or pivot is achieved when pivot arm 132 makes direct contact with frame 142 or indirect contact such as through, for example, a pivot stop attached to frame 142. Pivot arm 134 and front caster 108 behave in a similar fashion.

Hence, as the wheelchair 100 accelerates forward and the moment created by accelerating force $F_a$ increases over the moment created by spring force $F_s$, pivot arms 132 and 134 begin to rotate or pivot thereby raising front casters 106 and 108 off the ground. As described, it is preferable that front casters 106 and 108 rise between 1 and 6 inches and most preferably between 1 and 4 inches off the ground so as to be able to traverse a curb or other obstacle of the same or similar height.

Referring now to FIG. 4C, a free body diagram illustrating the forces acting on wheelchair 100 when the wheelchair is decelerating is shown. The forces are the same as those of FIG. 4A, except that a deceleration force $F_d$ is acting on drive wheel 102 instead of an acceleration force $F_a$. A similar force acts on drive wheel 104. The moment generated by the deceleration force $F_d$ causes pivot arm 132 to rotate in the same direction as the moment generated by spring force $F_s$, i.e., clockwise as shown. If front caster 106 is not contacting the ground, this pivot arm rotation causes front caster 106 to lower until it makes contact with the ground. If front caster 106 is already contacting the ground, then no further movement of front caster 106 is possible. Hence, when wheelchair 100 decelerates, front caster 106 is urged towards the ground. Pivot arm 134 and front caster 108 behave in a similar manner.

The spring force $F_s$ can be used to control the amount of acceleration and deceleration that is required before pivot arm 132 pivots and raises or lowers front caster 106. For example, a strong or weak spring force would require a stronger or weaker acceleration and deceleration before pivot arm 132 pivots and raises or lowers front caster 106, respectively. The exact value of the spring force $F_s$ depends on designer preferences and overall wheelchair performance requirements for acceleration and deceleration. For example, the spring force $F_s$ must be strong enough to keep chair 120 and the passenger from tipping forward due to inertia when the wheelchair is decelerating. It should also be noted that, in conjunction with the spring force $F_s$, the center of gravity of the person $C_{gp}$ sitting in the wheelchair can be modified. For example, the center of gravity $C_{gp}$ may be moved further rearward from vertical centerline 402 by moving chair 120 rearward along frame 142 with or without adjusting the magnitude of the spring force $F_s$. Moreover, the position of pivotal connection P may be moved along the length of pivot arms 132 and 134 thereby changing the ratio of distances between the pivotal connection P and the motor drive assemblies and casters 106 and 108 thereby resulting changing the dynamics of the pivot arms and wheelchair. Hence, a combination of features can be varied to control the pivoting of pivot arms 132 and 132 and the raising and lowering of front casters 106 and 108.

Figure 5E:
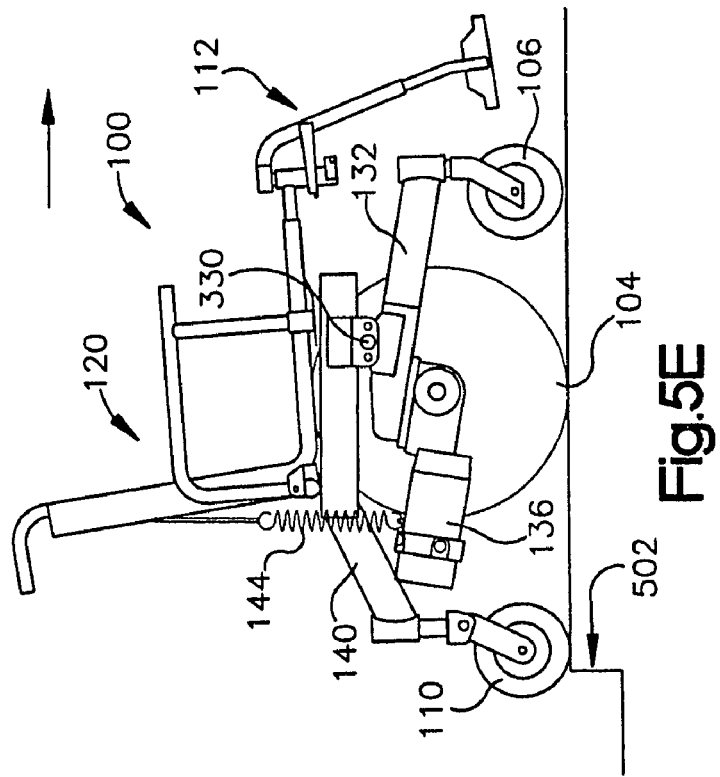

Referring now to FIGS. 5A through 5E, the curb-climbing capability of wheelchair 100 will now be described. In FIG. 5A, the wheelchair 100 approaches a curb 502 of approximately 2 to 4 inches in height. The wheelchair 100 is positioned so that front casters 106 and 108 are approximately 6 inches from the curb 502. Alternatively, wheelchair 100 can be driven directly to curb 502 such that front casters 106 and 108 bump against curb 502 and are driven thereunto, provided the height of curb 502 is less than the axle height of front casters 106 and 108 (not shown).

Nevertheless, in FIG. 5B from preferably a standstill position, drive motors 136 and 138 are "torqued" so as to cause pivot arms 132 and 134 to pivot about, for example, pin or bolt 330 and raise front casters 106 and 108 off the ground. The torquing of drive motors 136 and 138 refers to the process by which drive motors 136 and 138 are directed to instantaneously produce a large amount of torque so that the acceleration force $F_a$ creates a moment greater than the moment generated by spring force $F_s$. Such a process is accomplished by the wheelchair's passenger directing the wheelchair to accelerate rapidly from the standstill position. For example, a passenger can push hard and fast on the wheelchair's directional accelerator controller (not shown) thereby directing the wheelchair to accelerate forward as fast as possible. As shown in FIG. 5B and as described in connection with FIGS. 4A-4C, such "torquing" causes pivot arms 132 and 134 to pivot about pin 330 thereby causing front casters 106 and 108 to rise. During torquing, the wheelchair 100 accelerates forward toward the curb 502 with the front casters 106 and 108 in the raised position.

In FIG. 5C, front casters 106 and 108 have passed over curb 502. As front casters 106 and 108 pass over or ride on top of curb 502, drive wheels 102 and 104 come into physical contact with the rising edge of curb 502. Due to the drive wheels' relatively large size compared to the height of curb 502, the drive wheels 102 and 104 are capable of engaging curb 502 and driving there over—thereby raising the wheelchair 100 over curb 502 and onto a new elevation. Once raised, the front casters 106 and 108 are lowered as the inertial forces of the passenger and battery approach zero. These inertial forces approach zero when wheelchair 100 either decelerates such as, for example, by engaging curb 502 or by accelerating wheelchair 100 to its maximum speed (under a given loading) at which point the acceleration approaches zero and wheelchair 100 approaches the state of dynamic equilibrium. Either scenario causes pivot arms 132 and 134 to lower front casters 106 and 108 onto the new elevation.

Figure 5D:
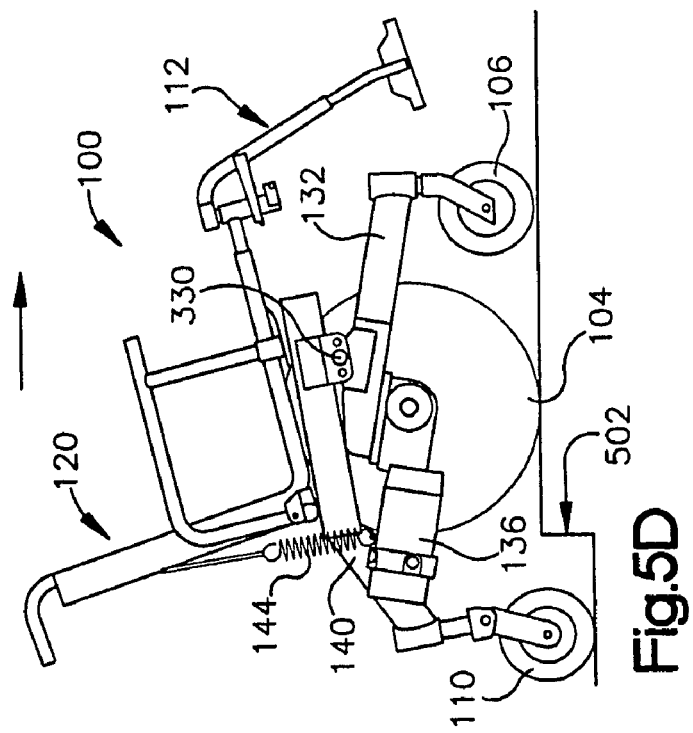

FIG. 5D shows wheelchair 100 after the drive wheels 102 and 104 have driven over curb 502 and onto the new elevation with front casters 106 and 108 lowered. Rear caster 110 still contacts the previous lower elevation. By such contact, rear caster 110 provides rearward stability preventing wheelchair 100 from tipping backwards as the wheelchair climbs the curb 502. FIG. 5E illustrates wheelchair 100 after rear caster 110 has engaged and surmounted curb 502.

Hence, the present invention provides a feature by which the front casters of a wheelchair can be raised and lowered when the wheelchair must climb or surmount a curb or obstacle. By raising the front casters to an appropriate position, whether completely clear of the curb or obstacle height or partially clear thereof, the wheelchair's drive wheels can, in effect, drive the wheelchair over the curb or obstacle.

Figure 6A:
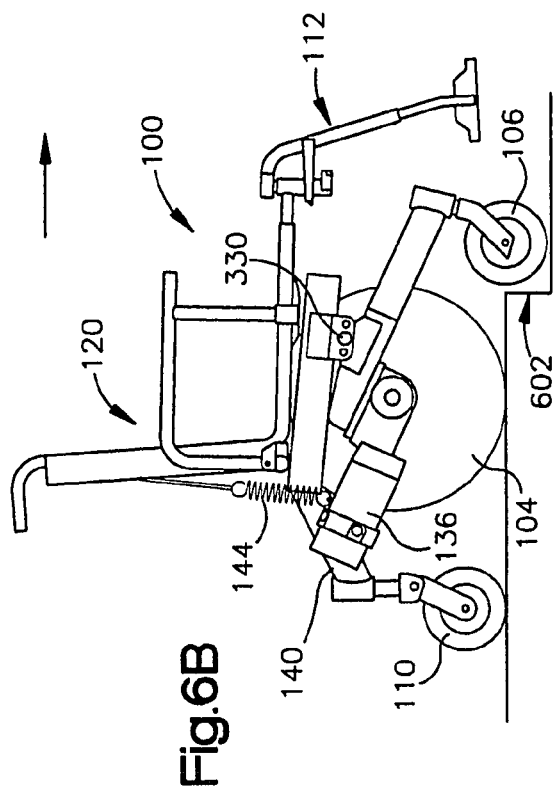
FIGS. 6A, 6B, 6C, and 6D sequentially illustrate the curb descending operation of the first embodiment.
Figure 6B:
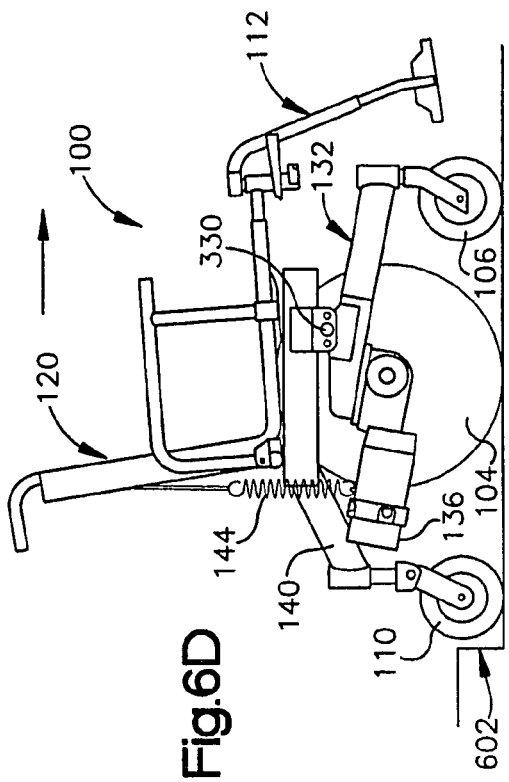

Referring now to FIGS. 6A through 6D, the curb-descending capability of wheelchair 100 will now be described. Referring now particularly to FIG. 6A, wheelchair 100 slowly approaches a curb 602, which represents a drop in elevation. In FIG. 6B, front casters 106 and 108 have gone over curb 602 and are in contact with the new lower elevation. As front casters 106 and 108 go over the curb or obstacle 602, they are urged downward toward the new lower elevation by the force generated by springs 144 and 146. This results in very little impact or feeling of loss of stability to the wheelchair passenger because the wheelchair 100 stays substantially level as the front casters 106 and 108 drop over curb 602 to the new lower elevation.

Figure 6C:
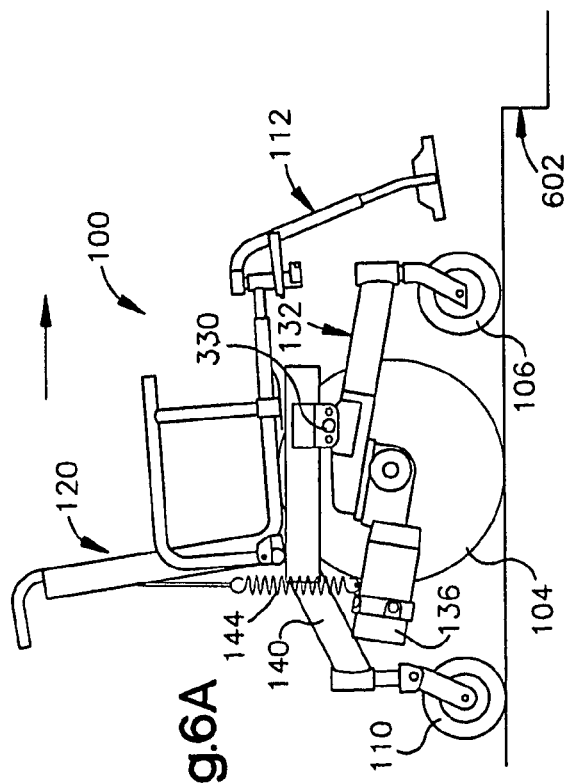

In FIG. 6C, drive wheels 102 and 104 have gone over curb 602 and are in contact with the new lower elevation. As drive wheels 102 and 104 go over curb 602, wheelchair 100 is prevented from tipping forward by springs 144 and 146 and front casters 106 and 108. More specifically, springs 144 and 146 urge the back of seat 120 rearward to counter any forward tipping tendency that the wheelchair may exhibit. In addition or in the alternative, an electromechanical stop or spring dampener can be energized by sensing inertial forces, angle of the wheelchair frame, or current to or from the drive motors, which would prevent the wheelchair from tipping forward (not shown).

Figure 6D:
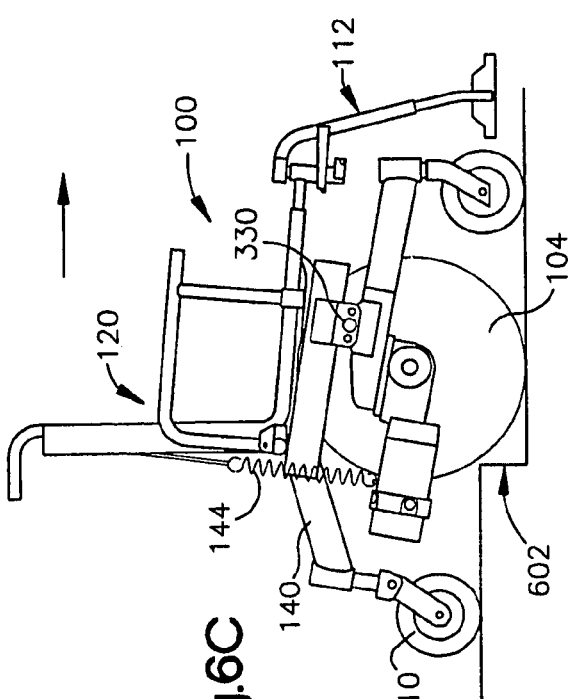

In FIG. 6D, rear caster 110 has gone over curb 602 and contacts the new lower elevation. As rear caster 110 drops down over curb or obstacle 602, very little impact or instability is experienced by the wheelchair passenger because most of the wheelchair's weight (including passenger weight) is supported by drive wheels 102 and 104, which are already on the new lower elevation. Hence, as rear caster 110 goes over curb 602 and contacts the new lower elevation, the wheelchair passenger experiences a low-impact transition between elevations.

Therefore, wheelchair 100 provides a stable, low-impact structure and method for climbing or descending over curb-like obstacles. In climbing curb-like obstacles, wheelchair 100 raises the front casters to a height sufficient for the front casters to go over the curb-like obstacle and allow the wheelchair's drive wheels to engage the obstacle. The rear caster provides rearward stability during such curb-climbing. In descending curb-like obstacles, wheelchair 100 lowers the front casters over the obstacle to provide forward stability as the drive wheels drive over the obstacle. The resilient members or springs provide rearward stability by urging the rear of the wheelchair's seat downward to counter any forward tipping tendency that the wheelchair may exhibit when descending a curb or obstacle. Additionally, chair or seat 120 can be moved rearward or tilted backward to increase wheelchair stability when descending a curb or obstacle.

Figure 7:
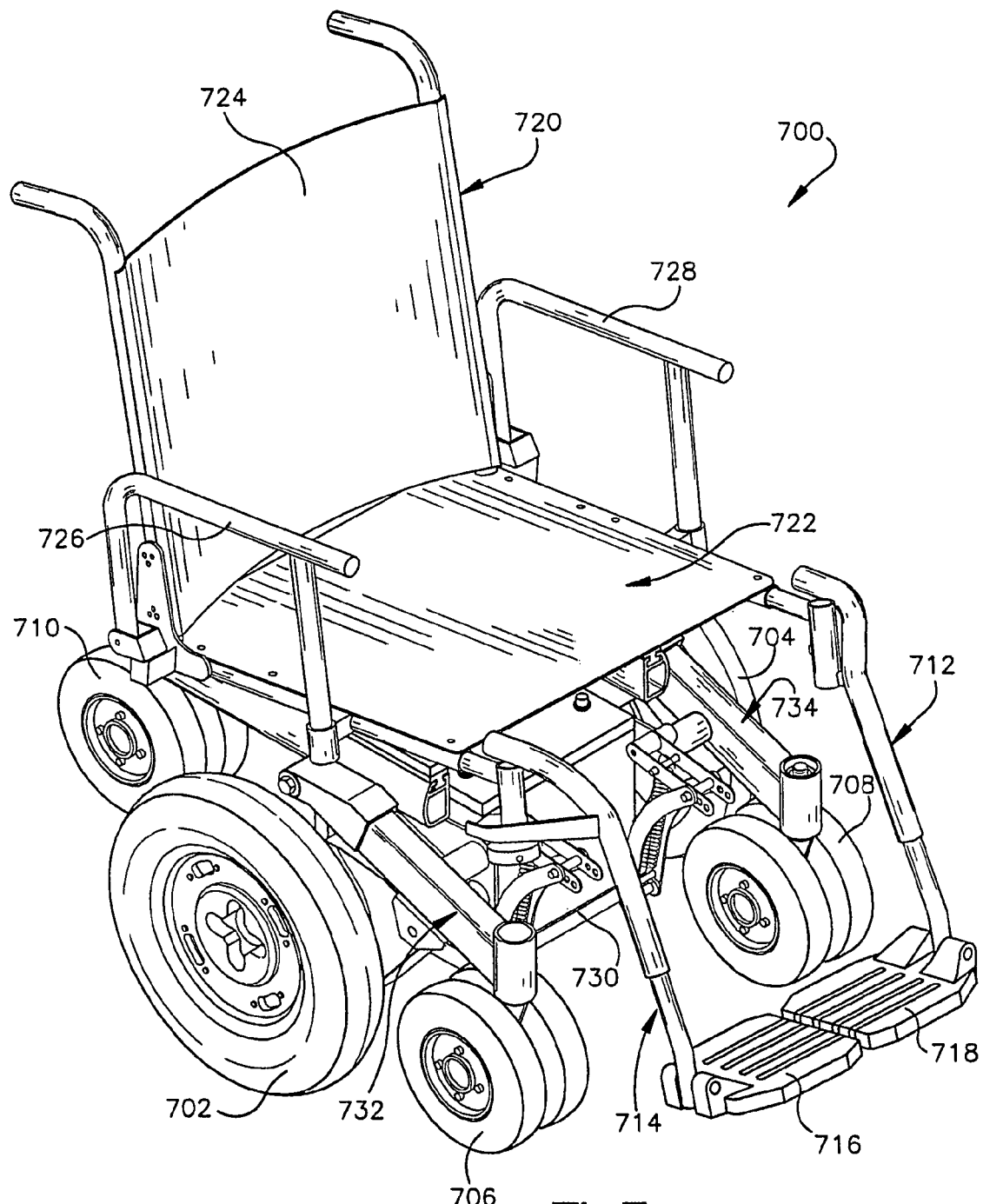
FIGS. 7 and 8 are front and rear perspective views, respectively, of a second embodiment of a wheelchair of the present invention.
Figure 8:
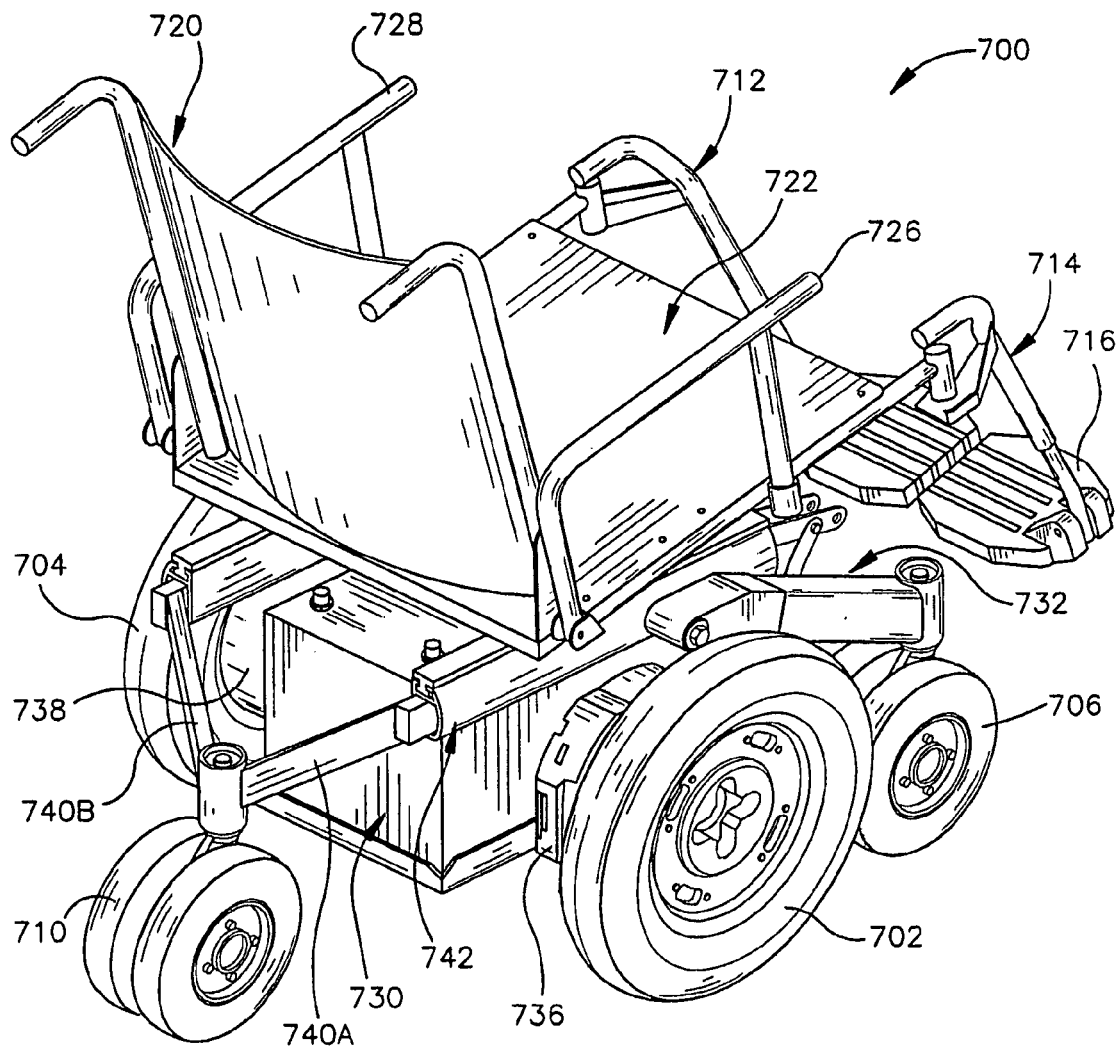

Referring now to FIGS. 7 and 8, a second embodiment of a curb-climbing wheelchair 700 of the present invention is shown. The wheelchair 700 has a pair of drive wheels 702 and 704, front casters 706 and 708, rear caster 710, and front riggings 712 and 714. As in wheelchair 100, the front riggings 712 and 714 include footrests 716 and 718 for supporting the feet of a passenger. The front riggings 712 and 714 are preferably mounted so as to be able to swing away from the shown center position to the sides of the wheelchair. Additionally, footrests 716 and 718 can swing from the shown horizontal-down position to a vertical-up position thereby providing relatively unobstructed access to the front of the wheelchair.

The wheelchair 700 further includes a chair 720 having a seat portion 722 and a back portion 724 for comfortably seating a passenger. Chair 720 is adjustably mounted to frame 742 (see FIG. 8) so as to be able to move forward and backward on frame 742, thereby adjusting the passenger's weight distribution and center of gravity relative to the wheelchair. As in wheelchair 100, chair 720 is preferably positioned such that a substantial portion of the wheelchair's weight when loaded with a passenger is evenly distributed between drive wheels 702 and 704. For example, the preferred weight distribution of wheelchair 700 when loaded with a passenger should be between 80% to 95% (or higher) on drive wheels 702 and 704. The remainder of the weight being distributed between the rear and front casters. Armrests 726 and 728 are also provided for resting the arms of a passenger or assisting a passenger in seating and unseating from chair 720.

The wheelchair 700 is preferably powered by one or more batteries 730, which reside beneath the chair 720 and in-between drive wheels 702 and 704. A pair of drive motors 736 and 738 (see FIG. 8) are used to power drive wheels 702 and 704. Drive motors 736 and 738 are preferably brushless, gearless, direct-drive motors with their rotors either internal or external to their stators. Drive motors 736 and 738 also each include a fail-safe braking mechanism that includes a manual release mechanism (not shown). A control system and controller (not shown) interface batteries 730 to drive motors 736 and 738 so as to allow a passenger to control the operation of the wheelchair 700. Such operation includes directing the wheelchair's acceleration, deceleration, velocity, braking, direction of travel, etc.

Front casters 706 and 708 are attached to pivot arms 732 and 734, respectively. Rear caster 710 is attached to rear caster arms 740A and 740B (see FIG. 8). While only one rear caster is shown, it should be understood that in the alternative two or more rear casters can also be provided. As will be described in more detail, pivot arms 732 and 734 are pivotally coupled to frame 742 for curb-climbing and descending, while rear caster arm 740A and 740B are rigidly coupled to frame 742.

Figure 9A:
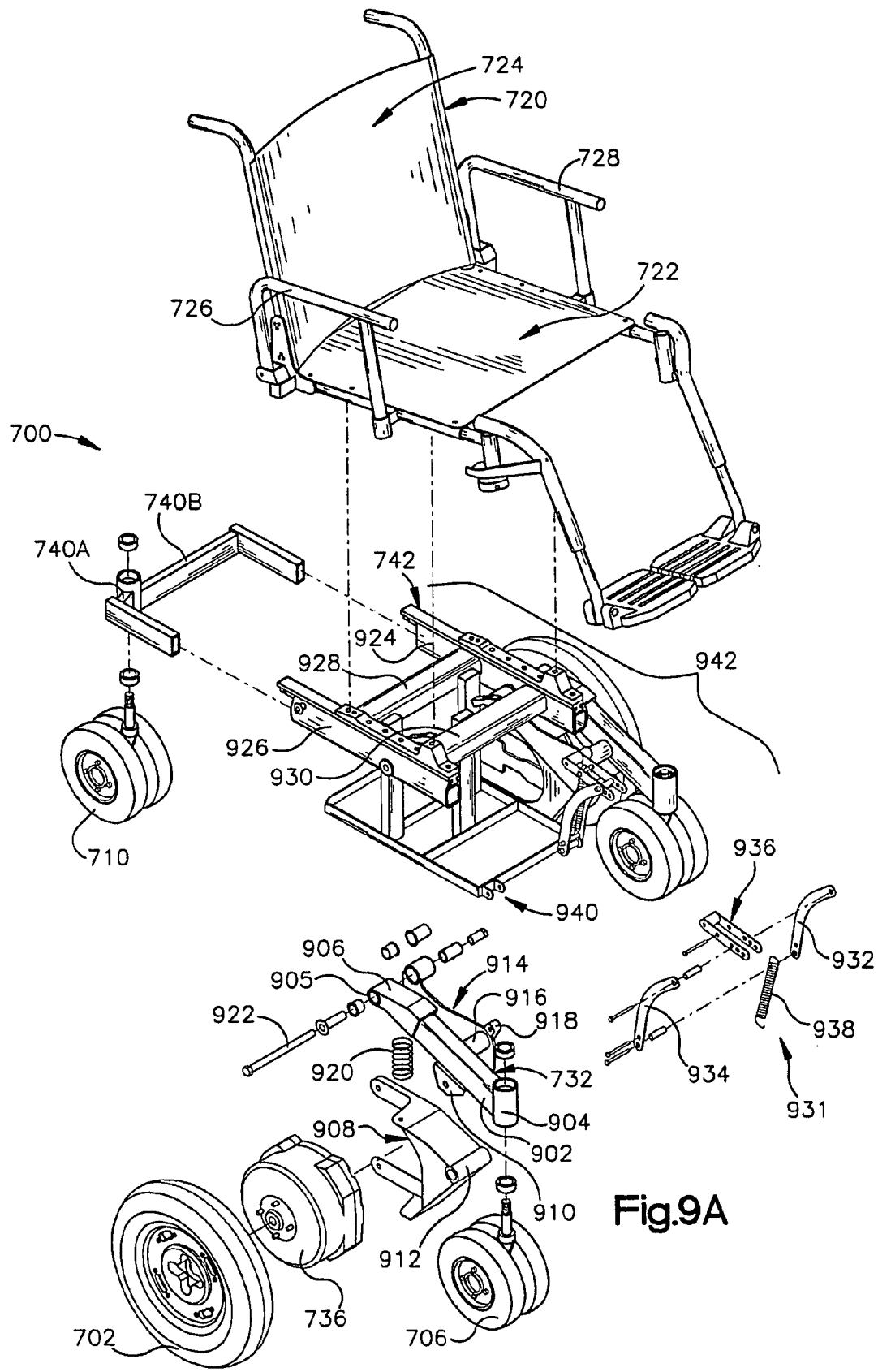
FIG. 9A is an exploded perspective view of certain components of the second embodiment.

The suspension and drive components of wheelchair 700 are further illustrated in the exploded prospective view of FIG. 9A. More specifically, pivot arm 732 has a base portion 906, an angled portion 902 extending therefrom, and a motor mount bracket 910. The distal end of angled portion 902 includes a front swivel assembly 904 that interfaces with front caster 706. Base portion 706 has a portion including a hole 905 for pivot pin 922 and associated sleeve fittings.

The suspension further includes a coupling plate 914 for interfacing front resilient assembly 931 to pivot arm 732. Coupling plate 914 is preferably rigidly affixed to pivot arm 732 via rigid tubular connection 916. Coupling plate 914 has a mounting bracket 918 configured to receive a pivot pin for interfacing to front resilient assembly 931. Configured as such, pivot arm 732 and coupling plate move in unison about pivot pin or bolt 922 subject to the forces and moments generated by front resilient assembly 931 and motor 736. Additionally, the suspension can further include a torsion member (not shown) between pivot arms 732 and 734 similar to the arrangement shown in FIG. 2B.

A resilient suspension member such as spring 920 extends between and is connected at its opposite ends to pivot arm 732 to a motor mount 908. Motor mount 908 has a pivot connection 912 that pivotally couples motor mount bracket 910 to pivot arm 732 and coupling plate 914 via a pivot pin. More specifically, motor mount 908 is pivotally received in a space between motor mount bracket 910 and coupling plate 914. Motor mount 908 further includes holes for fastening motor 136 thereto. Configured as such, motor 736 is pivotally coupled to pivot arm 732, which is itself pivotally coupled to frame 742.

Figure 10A:
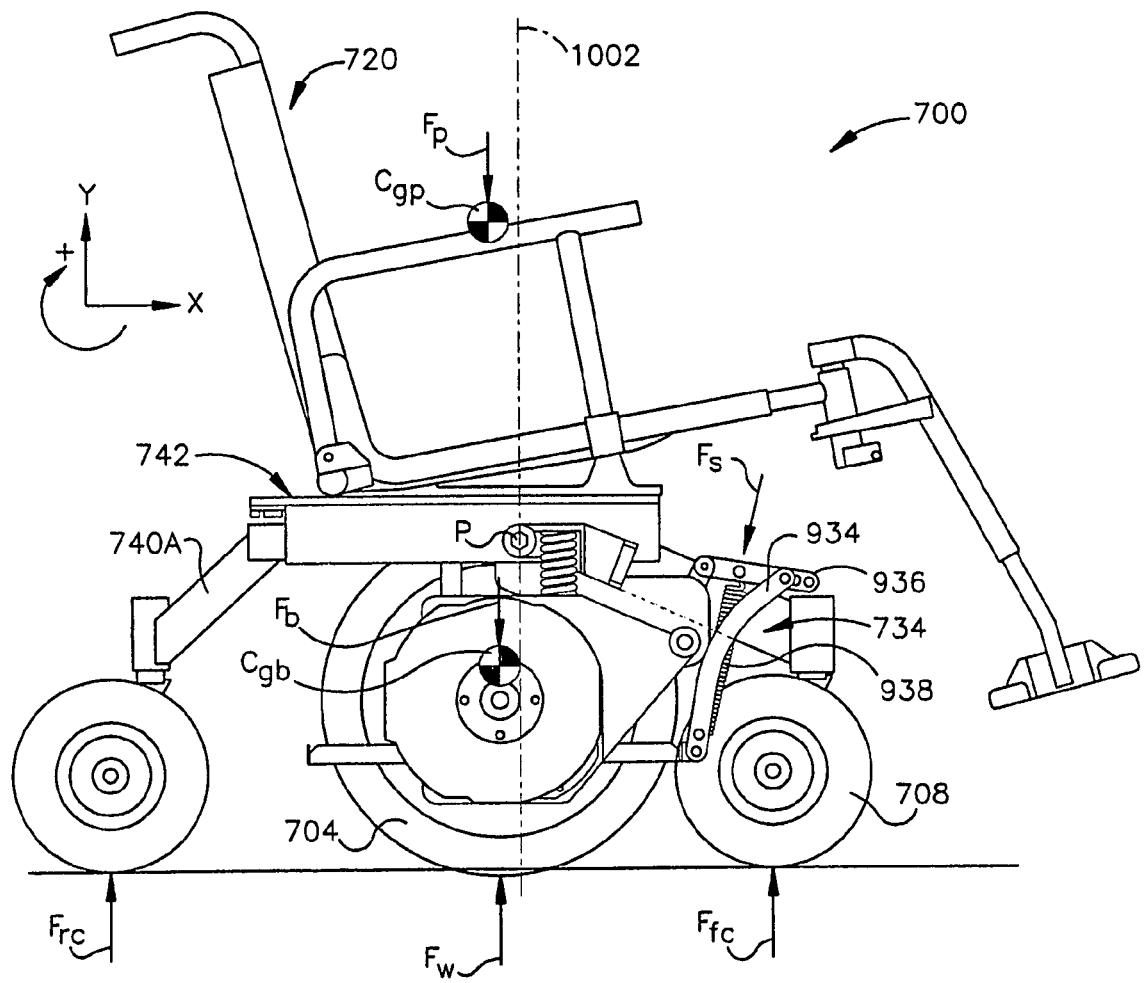
FIGS. 10A, 10B, and 10C are illustrations showing the forces acting on the wheelchair of the second embodiment in the static, accelerating and decelerating mode of operation.

Referring now to FIGS. 9A and 10A, front resilient assembly 931 has a spring 938 that is indirectly coupled to frame 742 and coupling plate 914 via arcuate pivot brackets 932 and 934 and horizontal pivot bracket 936. Arcuate pivot brackets 932 and 934 are generally curved and have holes in their distal portions. The holes are used for securing arcuate pivot brackets 932 and 934 to frame mounting bracket 940 and to horizontal pivot bracket 936 via screws or pins. Spring 938 is coupled to the lower portions of arcuate pivot brackets 932 and 934 proximate to frame mounting bracket 940 and to one of a plurality of points shown between the distal portions of horizontal pivot bracket 936.

In this regard, horizontal pivot bracket 936 has a first distal portion having a pivot hole for interfacing with coupling plate 914 and, more particular, spring mounting bracket 918. The other distal portion of horizontal pivot bracket 936 has a plurality of mounting holes that allow for the mounting of arcuate pivot brackets 932 and 934 in various positions. So configured front resilient assembly 931 is similar in function to springs 144 and 146 of wheelchair 100. However, the configuration of linkages 932, 934, and 936 and spring 938 of front resilient assembly 931 provide for a constant spring force over the range of pivoting of pivot arm 732.

FIGS. 11A through 11E and 12A through 12D illustrate the response of the front resilient assembly 931 linkages with respect to wheelchair 700 climbing and descending a curb-like obstacle.

Still referring to FIG. 9A, frame 742 includes longitudinal side members 924 and 926 and cross-brace members 928 and 930. Pivot arm 732 is pivotally mounted to side members 926 through pivot arm base member 906 and pin 922. Motor 736 is pivotally mounted to pivot arm 732 through motor mount 908 and its pivot assembly 912. Since motor 736 is pivotal with respect to pivot arm 732, spring 920 provides a degree of suspension between the two pivotal components. Additionally, since pivot arm 732 pivots with respect to frame 742, spring 938 and associated vertical and horizontal pivot brackets 934, 936, and 938, respectively, urge pivot arm 732 such that front caster 706 is urged downward toward the riding surface. This is similar in functionality to spring 144 of wheelchair 100.

Figure 9B:
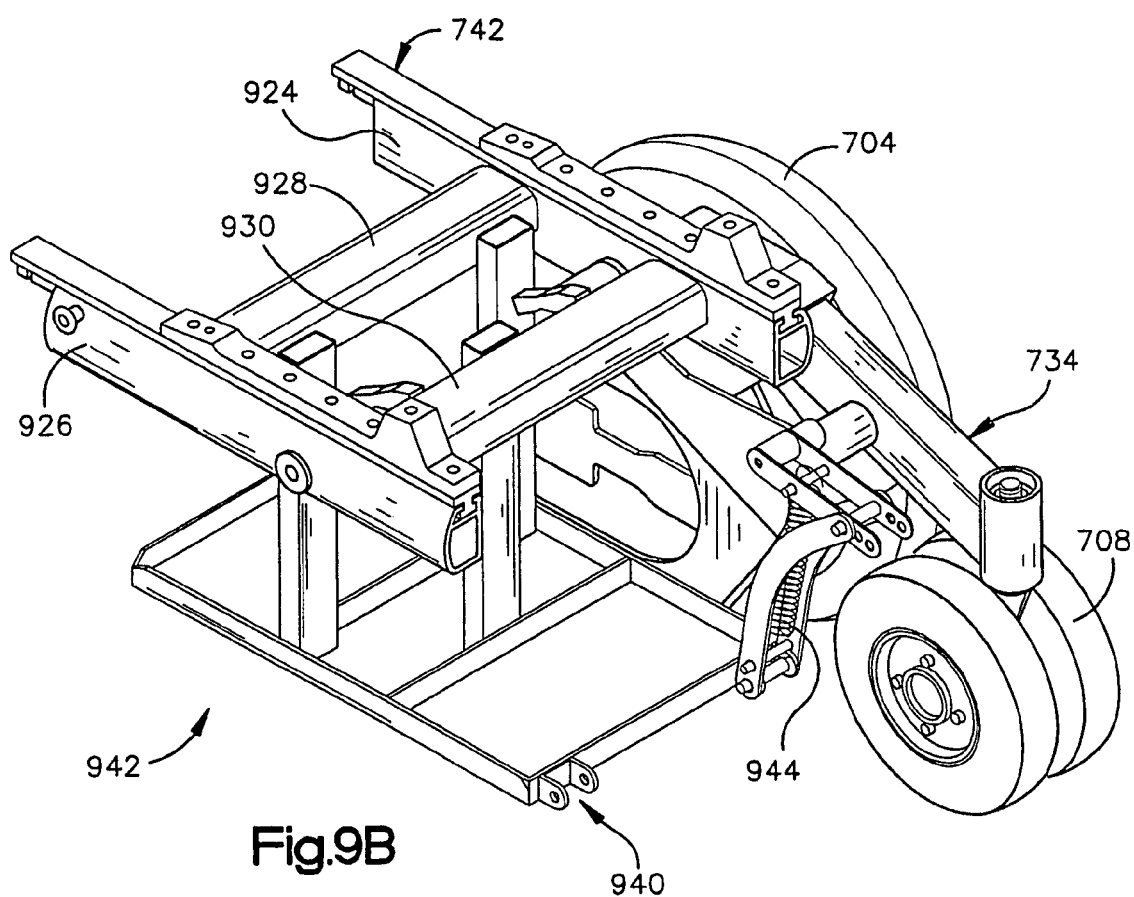
FIG. 9B is an enlarged view of a portion of FIG. 9A showing an assembled drive wheel and caster arrangement.

FIG. 9B is an enlarged view of portion 942 of FIG. 9A. More specifically, portion 942 shows pivot arm 734 and its associated components, which are similarly configured to pivot arm 732 and its associated assemblies, in their assembled positions on frame 742.

Figure 10B:
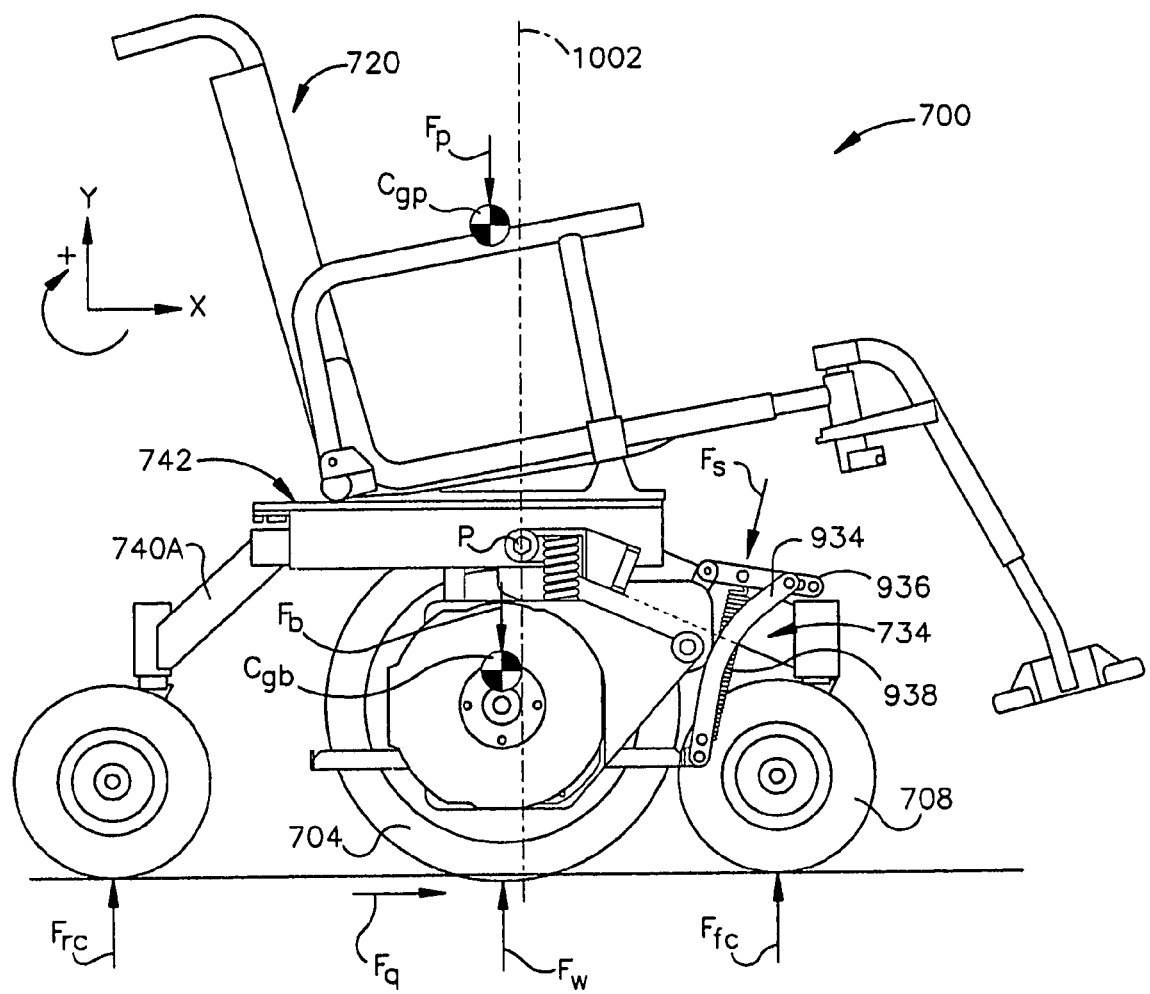
Figure 10C:
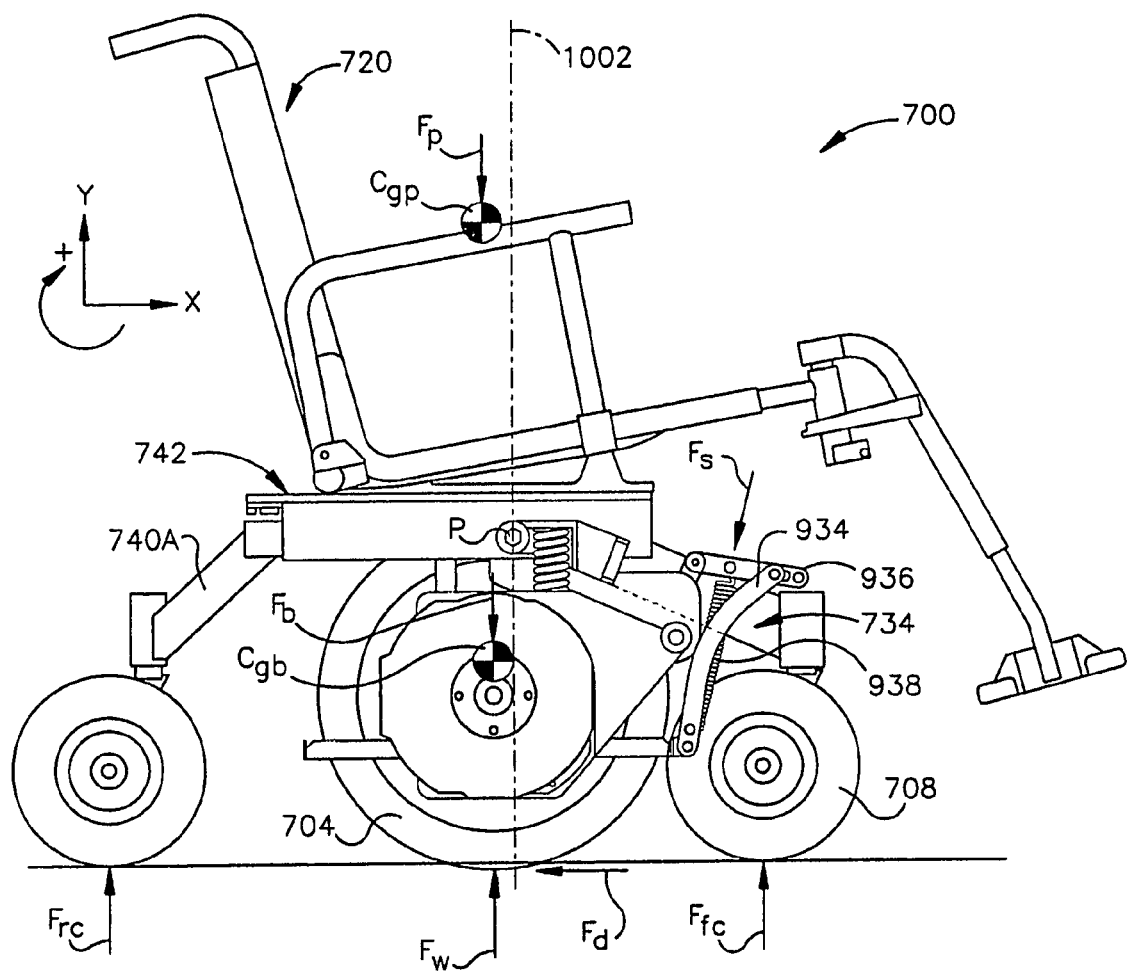

Referring now to FIGS. 10A through 10C, free body diagrams illustrating various centers of gravity and the forces acting on wheelchair 700 will now be described. In particular, FIG. 10A is a free body diagram illustrating the forces acting on wheelchair 700 when the wheelchair is in static equilibrium. The various forces shown include $F_p$, $F_b$, $F_s$, $F_{fc}$, $F_{rc}$, and $F_w$. As described in FIGS. 4A-4C, $F_p$ is the force representing gravity acting on the center of gravity of a person $C_{gp}$ sitting in wheelchair 700. Similarly, $F_b$ is the force representing gravity acting on the center of gravity of the batteries $C_{gb}$ used to power wheelchair 100. Spring 944 introduces a force $F_s$ acting on pivot arm 732. Spring 938 (see FIG. 9A) provides a similar force on pivot arm 732. Rear caster 710 has a force $F_{rc}$ acting on its point of contact with the ground. Front caster 708 has a force $F_{fc}$ acting on its point of contact with the ground. Front caster 706 (see FIG. 9A) has a similar force acting on it as well. Drive wheel 704 has force $F_w$ acting on its point of contact with the ground and drive wheel 702 (see FIG. 9A) also has a similar force acting thereon.

In wheelchair 700, the center of gravity $C_{gp}$ of a person sitting in the chair is preferably located just behind a vertical centerline 1002 through pivotal connection P. Similarly, the center of gravity $C_{gb}$ of the batteries is located behind the vertical centerline 1002. As already described, it is possible to obtain between approximately 80% to 95% weight distribution on drive wheels 702 and 704, with the remainder of the weight being distributed between the front casters 706 and 708 and the rear caster 710. As will be explained in more detail, such an arrangement facilitates the raising and lowering of the front casters 706 and 708 during acceleration and deceleration of the wheelchair 700.

Under static equilibrium such as, for example, when the chair is at rest or not accelerating or decelerating as shown in FIG. 10A, the net rotational moment around pivotal connection P and pivot arms 732 and 734 is zero (0) (i.e., $\Sigma F_n r_n = 0$, where F is a force acting at a distance r from the pivotal connection P and n is the number of forces acting on the wheelchair). Hence, pivot arms 732 and 734 do not tend to rotate or pivot.

In FIG. 10B, wheelchair 700 is shown accelerating. The forces are the same as those of FIG. 10A, except that an acceleration force $F_a$ is acting on drive wheel 704. A similar force acts on drive wheel 702. When the moment generated by the acceleration force $F_a$ exceeds the moment generated by spring force $F_s$, pivot arm 734 will begin to rotate or pivot such that front caster 708 begins to rise. As the moment generated by the acceleration force $F_a$ continues to increase over the moment generated by spring force $F_s$, pivot arm 734 increasingly rotates or pivots thereby increasingly raising front caster 708 until the maximum rotation or pivot has been achieved. The maximum rotation or pivot is achieved when pivot arm 734 makes direct contact with frame 742 or indirect contact such as through, for example, a pivot stop attached to frame 742. Pivot arm 734 and front caster 708 behave in a similar fashion.

Hence, as the wheelchair 700 accelerates forward and the moment created by accelerating force $F_a$ increases over the moment created by spring force $F_s$, pivot arms 732 and 734 being to rotate or pivot thereby raising front casters 706 and 708 off the ground. As described, it is preferable that front casters 706 and 708 rise between 1 and 6 inches off the ground so as to be able to overcome a curb or other obstacle of the same or similar height.

Referring now to FIG. 10C, a free body diagram illustrating the forces acting on wheelchair 700 when the wheelchair is decelerating is shown. The forces are the same as those of FIG. 10A, except that a deceleration force $F_d$ is acting on drive wheel 702 instead of an accelerating force $F_a$. A similar force acts on drive wheel 702. The moment generated by the deceleration force $F_d$ causes pivot arm 734 to rotate in the same direction as the moment generated by spring force $F_s$, i.e., clockwise as shown. If front caster 708 is not contacting the ground, this pivot arm rotation causes front caster 708 to lower until it makes contact with the ground. If front caster 708 is already contacting the ground, then no further movement of front caster 708 is possible. Hence, when wheelchair 700 decelerates, front caster 708 is urged clockwise or towards the ground. Pivot arm 732 and front caster 706 behave in a similar manner.

As with wheelchair 100, the spring force $F_s$ can be used to control the amount of acceleration and deceleration that is required before pivot arm 734 pivots and raises or lowers front caster 708. For example, a strong or weak spring force would require a stronger or weaker acceleration and deceleration before pivot arm 734 pivots and raises or lowers front caster 708, respectively. The exact value of the spring force $F_s$ depends on designer preferences and overall wheelchair performance requirements for acceleration and deceleration. For example, the spring force $F_s$ must be strong enough to keep chair 720 and the passenger from tipping forward due to inertia when the wheelchair is decelerating. Additionally, because horizontal pivot bracket 936 has a plurality of mounting holes (see FIG. 9A, for example) for mounting vertical pivot brackets 932 and 934, the amount of spring force $F_s$ applied to the pivot arms can also be controlled by the appropriate choice of mounting for such brackets. It should also be noted that, either alone or in conjunction with the spring force $F_s$ and the vertical and horizontal pivot bracket configuration, the center of gravity of the person $C_{gp}$ sitting in the wheelchair can be modified. For example, the center of gravity $C_{gp}$ may be moved further rearward from vertical centerline 1002 with or without adjusting the magnitude of the spring force $F_s$. Hence, a combination of features can be varied to control the pivoting of pivot arms 732 and 732 and the raising and lowering of front casters 706 and 708.

Referring now to FIGS. 11A through 11E, the curb-climbing capability of wheelchair 700 will now be described. In FIG. 11A, the wheelchair 700 approaches a curb 1102 of approximately 3 to 6 inches in height. The wheelchair 700 is positioned so that front casters 706 and 708 are approximately 6 inches from the curb 1102. Alternatively, wheelchair 700 can be driven directly to curb 1102 such that front casters 706 and 708 bump against curb 1102 and are driven thereunto, provided the height of curb 1102 is less than the axle height of front casters 706 and 708 (not shown).

Nevertheless, in FIG. 11B from preferably a standstill position, drive motors 736 and 738 are "torqued" so as to cause pivot arms 732 and 734 to pivot about, for example, pin or bolt 922 and raise front casters 706 and 708 off the ground. As described earlier, the torquing of drive motors 736 and 738 refers to the process by which drive motors 736 and 738 are directed to instantaneously produce a large amount of torque so that the acceleration force $F_a$ creates a moment greater than the moment generated by spring force $F_s$. Such a process is accomplished by the wheelchair's passenger directing the wheelchair to accelerate rapidly from the standstill position. For example, a passenger can push hard and fast on the wheelchair's directional accelerator controller (not shown) thereby directing the wheelchair to accelerate forward as fast as possible. As shown in FIG. 11B and as described in connection with FIGS. 10A-10C, such "torquing" causes pivot arms 732 and 734 to pivot about pin 922 thereby causing front casters 706 and 708 to rise. During torquing, the wheelchair 700 accelerates forward toward the curb 1102 with the front casters 706 and 708 in the raised position.

In FIG. 11C, front casters 706 and 708 have passed over curb 1102. As front casters 706 and 708 pass over or ride on top of curb 1102, drive wheels 702 and 704 come into physical contact with the rising edge of curb 1102. Due to the drive wheels' relatively large size compared to the height of curb 1102, the drive wheels 702 and 704 are capable of engaging curb 1102 and driving there over—thereby raising the wheelchair 700 over curb 1102 and onto a new elevation. As drive wheels 702 and 704 engage curb 1102, suspension spring 920 cushions the impact of the transition. Once raised, the front casters 706 and 708 are lowered as the inertial forces of the passenger and battery approach zero. These inertial forces approach zero when wheelchair 700 either decelerates such as, for example, by engaging curb 1102 or by accelerating wheelchair 700 to its maximum speed (under a given loading) at which point the acceleration approaches zero and wheelchair 700 approaches the state of dynamic equilibrium. Either scenario causes pivot arms 732 and 734 to lower front casters 706 and 708 onto the new elevation.

FIG. 11D shows wheelchair 700 after the drive wheels 702 and 704 have driven over curb 1102 and onto the new elevation with front casters 706 and 708 lowered. Rear caster 710 still contacts the previous lower elevation. By such contact, rear caster 710 provides rearward stability preventing wheelchair 700 from tipping backwards as the wheelchair climbs the curb or obstacle 1102. FIG. 11E illustrates wheelchair 700 after rear caster 710 has engaged and surmounted curb or obstacle 1102. FIGS. 12A, 12B, 12C, 12D, and 12E correspond to enlarge portions of FIGS. 11A, 11B, 11C, 11D, and 11E, respectively, particularly showing the orientation and range of motion experienced by front resilient assembly 931 as the wheelchair climbs a curb.

Hence, the embodiment of wheelchair 700 provides a feature by which the front casters of a wheelchair can be raised and lowered when the wheelchair must climb or surmount a curb or obstacle. By raising the front casters to an appropriate position, whether completely clear of the curb or obstacle height or partially clear thereof, the wheelchair's drive wheels can, in effect, drive the wheelchair over the curb or obstacle.

Figure 13A:
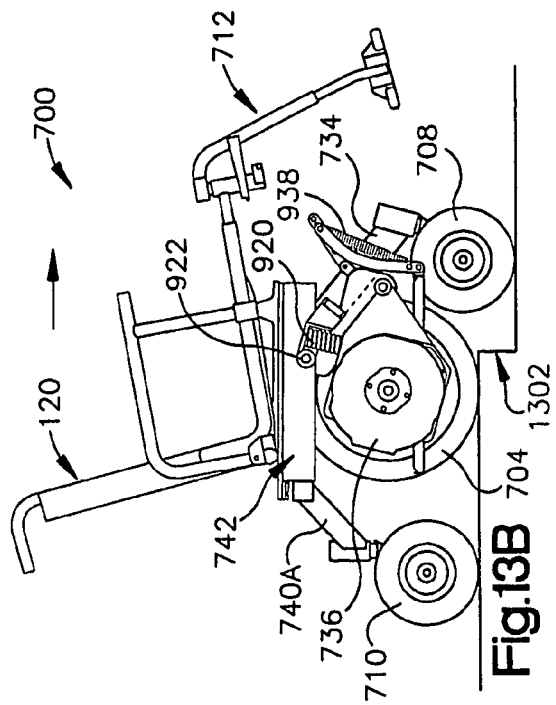
FIGS. 13A, 13B, 13C, and 13D sequentially illustrate the curb-descending operation of the second embodiment.
Figure 13B:
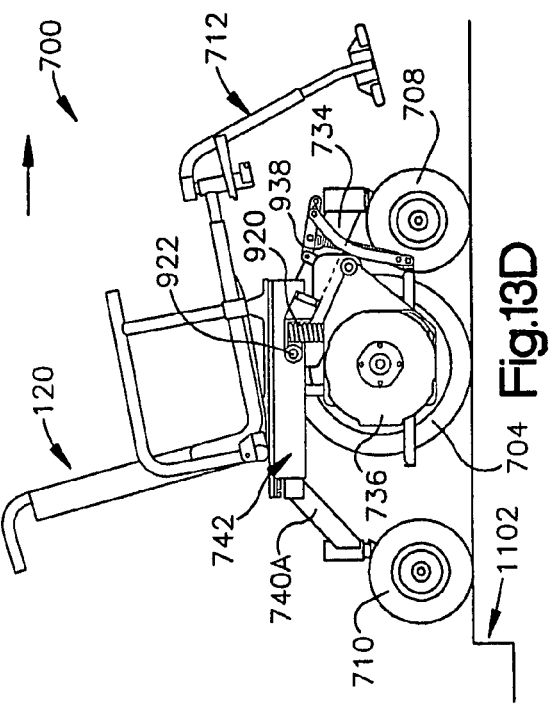

Referring now to FIGS. 13A through 13D, the curb descending capability of wheelchair 700 will now be described. Referring now particularly to FIG. 13A, wheelchair 700 slowly approaches a curb 1302, which represents a drop in elevation. In FIG. 13B, front casters 706 and 708 have gone over curb 1302 and are in contact with the new lower elevation. As front casters 706 and 708 go over curb 1302, they are urged downward toward the new lower elevation by the force generated by springs 938 and 944. This results in very little impact or feeling of loss of stability to the wheelchair passenger because the wheelchair 700 stays substantially level as the front casters 706 and 708 drop over curb 1302 to the new lower elevation.

Figure 13C:
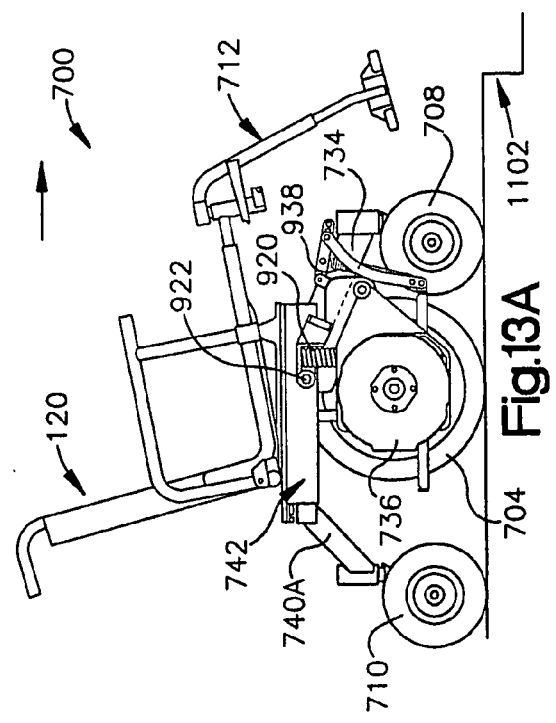

In FIG. 13C, drive wheels 702 and 704 have gone over curb 1302 and are in contact with the new lower elevation. As drive wheels 702 and 704 go over curb or obstacle 1302, suspension springs such as spring 920 cushion the impact of such a transition. Also as drive wheels 702 and 704 go over curb 1302, wheelchair 700 is prevented from tipping forward by springs 938 and 944 and front casters 706 and 708. More specifically, springs 938 and 944 urge the front of frame 742, through frame mounting bracket 940 (see FIGS. 9 and 10), upward to counter any forward tipping tendency that the wheelchair may exhibit.

Figure 13D:
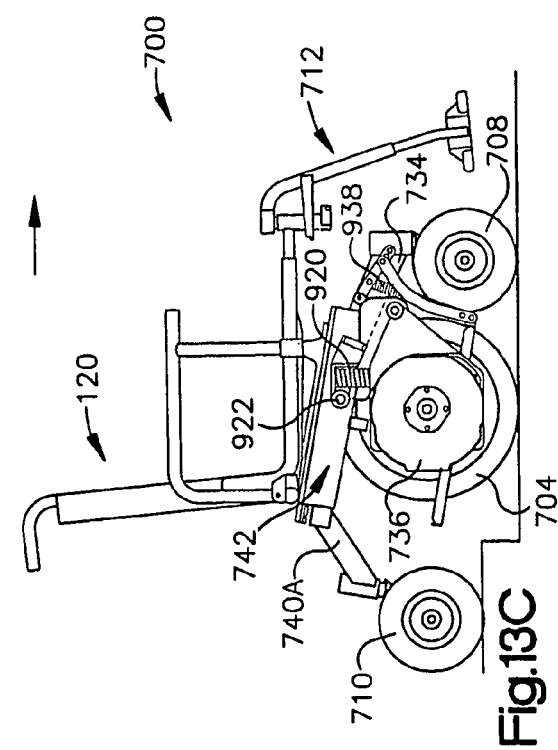

In FIG. 13D, rear caster 710 has gone over curb 1302 and contacts the new lower elevation. As rear caster 710 drops down over curb 1302, very little impact or instability is experienced by the wheelchair passenger because most of the wheelchair's weight (including passenger weight) is supported by drive wheels 702 and 704, which are already on the new lower elevation. Hence, as rear caster 710 goes over curb 1302 and contacts the new lower elevation, the wheelchair passenger experiences a low-impact transition between elevations.

Therefore, wheelchair 700 provides a stable, low-impact structure and method for climbing or descending over curb-like obstacles. In climbing curb-like obstacles, wheelchair 700 raises the front casters to a height sufficient for the front casters to go over the curb-like obstacle and allow the wheelchair's drive wheels to engage the obstacle. The rear caster provides rearward stability during such curb-climbing. In descending curb-like obstacles, wheelchair 700 lowers the front casters over the obstacle to provide forward stability as the drive wheels drive over the obstacle. Suspension springs associated with the drive wheels provide for low-impact transitions for the passenger between elevations representing curbs or obstacles. Springs associated with the front casters provide forward stability by urging the front of the wheelchair's frame upward to counter any forward tipping tendency that the wheelchair may exhibit when descending a curb or obstacle.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the pivot arms can be made from a plurality of components having differing geometry, the wheelchair may or may not include spring forces acting on the pivot arms, the invention can be applied to rear-wheel and front-wheel drive wheelchairs, elastomeric resilient members can be used instead of or in combination with springs, electrically adjustable spring tension devices can be included with the springs, etc. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A wheelchair suspension comprising:
   a frame;
   a pivot arm pivotally coupled to the frame;
   a front caster coupled to the pivot arm;
   a drive assembly mounting bracket;
   a rear caster coupled to the frame; and
   wherein movement of the drive assembly mounting bracket with respect to the frame in a first direction causes the pivot arm to remain in substantially a first position; and
   movement of the drive assembly mounting bracket with respect to the frame in a second direction urges the pivot arm away from the first position.

2. The wheelchair suspension of claim 1 wherein movement of the drive assembly mounting bracket with respect to the frame in the second direction pushes the pivot arm upward.

3. The wheelchair suspension of claim 1 wherein relative movement between the drive assembly mounting bracket and the pivot arm is dampened.

4. The wheelchair suspension of claim 3 wherein the relative movement between the drive assembly mounting bracket and the pivot arm is dampened by a spring.

5. The wheelchair suspension of claim 1 wherein the movement of the drive assembly mounting bracket with respect to the frame in the second direction relative to the frame pushes the pivot arm upward to urge the front caster away from a support surface.

6. The wheelchair suspension of claim 1 wherein the drive assembly mounting bracket is pivotally coupled to the frame.

7. The wheelchair suspension of claim 6 wherein the drive assembly mounting bracket is pivotally coupled to the pivot arm and the pivot arm is pivotally coupled to the frame.

8. The wheelchair suspension of claim 1 wherein movement of the drive assembly mounting bracket with respect to the frame in the second direction causes the pivot arm to move upward.

9. The wheelchair suspension of claim 1 wherein movement of the drive assembly mounting bracket with respect to the frame in the first direction comprises upward movement of the drive assembly and movement of the drive assembly in the second direction comprises downward movement of the drive assembly.

10. The wheelchair suspension of claim 1 wherein the pivot arm is coupled to the frame at a pivotal connection and force is applied by the drive assembly mounting bracket to the pivot arm between the pivotal connection and the front caster.

11. The wheelchair suspension of claim 10 wherein force applied by the drive assembly mounting bracket to the pivot arm causes the pivot arm to move upward.

12. The wheelchair suspension of claim 10 wherein movement of the drive assembly mounting bracket with respect to the frame in the second direction pushes the front caster upward.

13. A wheelchair suspension comprising:
    a frame;
    a seat supported by the frame;
    a rear caster coupled to the frame;
    a pair of suspension assemblies disposed on opposite sides of the frame, each suspension assembly comprising:
    a pivot arm coupled to the frame;
    a front caster coupled to the pivot arm;
    a drive assembly mounting bracket;
    wherein the movement of the drive assembly mounting bracket with respect to the frame in a first direction causes the pivot arm to remain in substantially a first position; and
    movement of the drive assembly mounting bracket with respect to the frame in a second direction urges the pivot arm away from the first position.

14. The wheelchair suspension of claim 13 wherein movement of the drive assembly mounting bracket with respect to the frame in the second direction pushes the pivot arm upward.

15. The wheelchair suspension of claim 13 wherein relative movement between the drive assembly mounting bracket with respect to the frame and the pivot arm is dampened.

16. The wheelchair suspension of claim 15 wherein the relative movement between the drive assembly mounting bracket and the pivot arm is dampened by a spring.

17. The wheelchair suspension of claim 13 wherein the pivotal movement of the drive assembly mounting bracket with respect to the frame in the second direction relative to the frame pushes the pivot arm upward to urge the front caster away from a support surface to traverse an obstacle.

18. The wheelchair suspension of claim 13 wherein the drive assembly mounting bracket is pivotally coupled to the frame.

19. The wheelchair suspension of claim 18 wherein the drive assembly mounting bracket is pivotally coupled to the pivot arm and the front caster pivot arm is pivotally coupled to the frame.

20. The wheelchair suspension of claim 13 wherein movement of the drive assembly mounting bracket with respect to the frame in the second direction causes the pivot arm to move upward.

21. The wheelchair suspension of claim 13 wherein the movement of the drive assembly mounting bracket with respect to the frame in the first direction comprises upward movement of the drive assembly and movement of the drive assembly in the second direction comprises downward movement of the drive assembly.

22. The wheelchair suspension of claim 13 wherein the pivot arm is coupled to the frame at a pivotal connection and force is applied by the drive assembly to the pivot arm between the pivotal connection and the front caster.

23. The wheelchair suspension of claim 22 wherein force applied by the drive assembly mounting bracket to the pivot arm causes the pivot arm to move upward.

24. The wheelchair suspension of claim 22 wherein movement of the drive assembly mounting bracket with respect to the frame in the second direction pushes the front caster upward.

25. A wheelchair suspension comprising:
a frame;
a pivot arm pivotally coupled to the frame;
a front caster coupled to the pivot arm;
a drive assembly mounting bracket;
a rear caster coupled to the frame; and
a means for coupling the pivot arm and the front caster such that movement of the drive assembly mounting bracket with respect to the frame in a first direction causes the pivot arm to remain in substantially a first position; and
movement of the drive assembly mounting bracket with respect to the frame in a second direction urges the pivot arm away from the first position.

26. A wheelchair comprising:
a frame;
a front caster assembly comprising a pivot arm;
a drive assembly comprising a pivot bracket;
wherein movement of the drive assembly rivot bracket with respect to the frame in a first direction causes the rivot arm to remain in substantially a first position; and
movement of the drive assembly rivot bracket with respect to the frame in a second direction urges the rivot arm away from the first position.

27. The wheelchair of claim 26 further comprising a spring interposed between the pivot bracket and the pivot arm.

28. The wheelchair of claim 26 wherein the pivot bracket is directly coupled to the pivot arm.

29. A wheelchair comprising:
a frame;
a pivot arm having a first pivot coupling;
a front caster coupled to the pivot arm;
a drive assembly having a mount, wherein the mount includes a second pivot coupling;
a rear caster coupled to the frame; and
wherein movement of the drive assembly mount in a first rivot direction causes the pivot arm to remain in substantially a first position; and
movement of the drive assembly mount in a second rivot direction urges the pivot arm away from the first position.

30. The wheelchair suspension of claim 29 wherein movement of the drive assembly mount in the second rivot direction urges the pivot arm upward.

31. The wheelchair suspension of claim 29 wherein movement between the drive assembly mount and the pivot arm is dampened.

32. The wheelchair suspension of claim 31 wherein the movement between the drive assembly mount and the pivot arm is dampened by a resilient device.

33. The wheelchair suspension of claim 29 further comprising a deformable member in physical communication with the drive assembly mount and pivot arm.

34. A wheelchair suspension comprising:
a frame;
a pivot arm pivotally coupled to the frame;
a front caster coupled to the pivot arm;
a drive assembly mounting bracket;
a rear caster coupled to the frame; and
wherein movement of the drive assembly mounting bracket with respect to the pivot arm in a first direction causes the pivot arm to remain in substantially a first position; and
movement of the drive assembly mounting bracket with respect to the pivot arm in a second direction urges the pivot arm away from the first position.

* * * * *

UNITED STATES PATENT AND TRADEMARK OFFICE
CERTIFICATE OF CORRECTION

PATENT NO.         : 7,597,163 B2                              Page 1 of 1
APPLICATION NO.    : 11/490899
DATED              : October 6, 2009
INVENTOR(S)        : Gerold Goertzen and William A. Null, Jr.

It is certified that error appears in the above-identified patent and that said Letters Patent is hereby corrected as shown below:

Column 15, line 18, please delete "rivot" and insert --pivot--

Column 15, line 19, please delete "rivot" and insert --pivot--

Column 15, line 21, please delete "rivot" and insert --pivot--

Column 15, line 22, please delete "rivot" and insert --pivot--

Column 16, line 3, please delete "rivot" and insert --pivot--

Column 16, line 5, please delete "rivot" and insert --pivot--

Column 16, line 9, please delete "rivot" and insert --pivot--

Signed and Sealed this

Twenty-second Day of December, 2009

David J. Kappos
*Director of the United States Patent and Trademark Office*